United States Patent
Sastry et al.

(10) Patent No.: US 12,211,283 B2
(45) Date of Patent: Jan. 28, 2025

(54) METHODS AND APPARATUS FOR DETECTING PETS

(71) Applicant: SimpliSafe, Inc., Boston, MA (US)

(72) Inventors: Shekhar Bangalore Sastry, Arlington, MA (US); Nicholas Setzer, Boston, MA (US)

(73) Assignee: SimpliSafe, Inc., Boston, MA (US)

(*) Notice: Subject to any disclaimer, the term of this patent is extended or adjusted under 35 U.S.C. 154(b) by 0 days.

(21) Appl. No.: 18/348,019

(22) Filed: Jul. 6, 2023

(65) Prior Publication Data
US 2024/0257521 A1   Aug. 1, 2024

Related U.S. Application Data

(60) Provisional application No. 63/482,233, filed on Jan. 30, 2023.

(51) Int. Cl.
*G06V 20/52* (2022.01)
*G06T 7/246* (2017.01)
(Continued)

(52) U.S. Cl.
CPC ............. *G06V 20/52* (2022.01); *G06T 7/248* (2017.01); *G06T 7/277* (2017.01); *G06V 10/82* (2022.01); *G06V 40/10* (2022.01); *G08B 13/19602* (2013.01); *G08B 29/185* (2013.01); *H04N 23/61* (2023.01); *H04N 23/667* (2023.01);
(Continued)

(58) Field of Classification Search
CPC ........ G06V 20/52; G06V 40/10; G06V 10/82; G06T 2207/30232; G06T 7/248; G06T 7/277; G06T 2207/10016; G06T 2207/10048; G06T 2207/20084; G06T 2207/30196; G08B 13/19602;
(Continued)

(56) References Cited

U.S. PATENT DOCUMENTS 6,580,812 B1   6/2003   Harrington
7,474,767 B2   1/2009   Sen et al.
(Continued)

FOREIGN PATENT DOCUMENTS

WO   2010084902 A1   7/2010
WO   2024155336 A1   7/2024

OTHER PUBLICATIONS

Notice of Allowance in U.S. Appl. No. 18/348,008 (dated Oct. 5, 2023) (12 pages).
(Continued)

*Primary Examiner* — Boubacar Abdou Tchoussou
(74) *Attorney, Agent, or Firm* — Finch & Maloney PLLC

(57) ABSTRACT

Methods and apparatus for pet detection in security systems. In one example, a method includes detecting a motion event in a scene using a motion detector, based on detecting the motion event, activating an image capture device to acquire a plurality of images of the scene, applying a motion detection process to the plurality of images to detect motion in the scene, applying an object detection process to at least one of the plurality of images to detect an object in the scene, pairing the motion with the object to locate a moving object, identifying the moving object as a pet, and based at least in part on identifying the moving object as a pet, deactivating the image capture device.

18 Claims, 15 Drawing Sheets

(51) Int. Cl.

| | | |
|---|---|---|
| *G06T 7/277* | (2017.01) | |
| *G06V 10/82* | (2022.01) | |
| *G06V 40/10* | (2022.01) | |
| *G08B 13/196* | (2006.01) | |
| *G08B 29/18* | (2006.01) | |
| *H04N 23/61* | (2023.01) | |
| *H04N 23/65* | (2023.01) | |
| *H04N 23/667* | (2023.01) | |

(52) U.S. Cl.
CPC ............. *G06T 2207/10016* (2013.01); *G06T 2207/10048* (2013.01); *G06T 2207/20084* (2013.01); *G06T 2207/30196* (2013.01); *G06T 2207/30232* (2013.01); *H04N 23/651* (2023.01)

(58) Field of Classification Search
CPC .... G08B 29/185; H04N 23/61; H04N 23/667; H04N 23/651
See application file for complete search history.

(56) References Cited

U.S. PATENT DOCUMENTS

| | | | |
|---|---|---|---|
| 8,189,049 | B2 | 5/2012 | Lopota et al. |
| 9,521,606 | B1 | 12/2016 | Costa et al. |
| 9,906,722 | B1* | 2/2018 | Gigot .................. H04N 23/651 |
| 10,333,923 | B2 | 6/2019 | Johri |
| 10,402,643 | B2 | 9/2019 | James et al. |
| 10,504,240 | B1 | 12/2019 | Solh et al. |
| 11,004,209 | B2 | 5/2021 | Chen et al. |
| 11,217,076 | B1 | 1/2022 | Siminoff et al. |
| 11,257,226 | B1* | 2/2022 | Solh ........................ G06F 18/22 |
| 11,288,551 | B2* | 3/2022 | Desai .................. G06F 18/2178 |
| 11,336,869 | B2* | 5/2022 | Yao ........................ G06T 7/0002 |
| 11,803,973 | B1 | 10/2023 | Xu et al. |
| 11,922,642 | B1 | 3/2024 | Setzer et al. |
| 11,922,669 | B1 | 3/2024 | Sastry et al. |
| 2005/0198600 | A1 | 9/2005 | Hasegawa |
| 2012/0314901 | A1 | 12/2012 | Hanson et al. |
| 2013/0293460 | A1 | 11/2013 | Kaplan et al. |
| 2016/0026890 | A1 | 1/2016 | Gupta et al. |
| 2016/0042621 | A1 | 2/2016 | Hogg et al. |
| 2017/0109613 | A1* | 4/2017 | Kolavennu ............ G06V 20/52 |
| 2018/0285650 | A1 | 10/2018 | George et al. |
| 2018/0288397 | A1 | 10/2018 | Lee |
| 2019/0087644 | A1 | 3/2019 | Goulden et al. |
| 2019/0087646 | A1 | 3/2019 | Goulden et al. |
| 2019/0311201 | A1* | 10/2019 | Selinger ............... G08B 25/006 |
| 2019/0318171 | A1 | 10/2019 | Wang et al. |
| 2020/0342748 | A1 | 10/2020 | Tournier et al. |
| 2021/0089841 | A1 | 3/2021 | Mithun et al. |
| 2021/0158048 | A1 | 5/2021 | Lee et al. |
| 2021/0329193 | A1 | 10/2021 | Wu et al. |
| 2021/0365707 | A1 | 11/2021 | Mao et al. |
| 2021/0390696 | A1 | 12/2021 | Iwase et al. |
| 2022/0201320 | A1 | 6/2022 | Karunaratne et al. |
| 2022/0222477 | A1 | 7/2022 | Shen et al. |
| 2023/0014948 | A1* | 1/2023 | Guan .................. G06V 10/751 |
| 2023/0156323 | A1* | 5/2023 | Hanzawa ............. H04N 23/651 348/143 |
| 2023/0306712 | A1* | 9/2023 | Lee ........................ G06T 7/248 |
| 2024/0031663 | A1 | 1/2024 | Morgan |
| 2024/0257360 | A1 | 8/2024 | Xu et al. |

OTHER PUBLICATIONS

Suman Tewary et al, Hybrid multi-resolution detection of moving targets in infrared imagery, Infrared Physics & Technology, Jul. 22, 2014, 173-183, 67.

Gustavo H.F. De Carvalho et al., Anomaly detection with a moving camera using multiscale video analysis, Multidim Syst Sign Process, (2019), 311-342, 30.

Nazir Sajid et al., "Person Detection with Deep Learning and IoT for Smart Home Security on Amazon Cloud", 2021 International Conference on Electrical, Computer, Communications and Mechatronics Engineering (ICECCME), IEEE, Oct. 7, 2021, pp. 1-6.

Shahid Aasma et al., "Computer vision based intruder detection framework (CV-IDF)", 2017 2nd International Conference on Computer and Communication Systems (ICCCS), IEEE, Jul. 7, 2017, pp. 41-45.

Ren et al., "Faster R-CNN: Towards Real-Time Object Detection with Region Proposal Networks", IEEE Transactions on Pattern Analysis And Machine Intelligence, vol. 39, No. 6, Jun. 6, 2017.

Wang et al., "Improved Object Detection Algorithim Based on Faster RCNN", Journal of Physics: Conference Series, 2022.

F. C. Akyon et al. "Slicing Aided Hyper Inference and Fine-Tuning for Small Object Detection,"Conference on Image Processing (ICIP), Bordeaux, France, Oct. 16-19, 2022, pp. 966-970.

Zhang et al., "Moving Objective Detection and Its Contours Extraction Using Level Set Method", IEEE International Conference on Control Engineering and Communication Technology, 2012, pp. 778-781.

Extended European Search Report received for EP Application No. 24154188.7, dated Jun. 6, 2024. 12 pages.

Agrawal et al., " An improved Gaussian Mixture Method based Background Subtraction Model for Moving Object Detection in Outdoor Scene", IEEE Fourth International Conference on Electrical, Computer and Communication Technologies (ICECCT), 2021.

* cited by examiner

METHODS AND APPARATUS FOR DETECTING PETS

CROSS-REFERENCE TO RELATED APPLICATIONS

This application claims the benefits under 35 U.S.C. § 119(e) and PCT Article 4 of co-pending U.S. Provisional Patent Application No. 63/482,233 filed on Jan. 30, 2023 and titled "METHODS AND APPARATUS FOR DETECTING PETS," which is hereby incorporated herein by reference in its entirety for all purposes.

TECHNICAL FIELD

Aspects of the technologies described herein relate to security systems and methods, more particularly, to motion-sensitive cameras and systems and methods utilizing the same.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

Aspects and examples are directed to techniques for reducing false positive alarms caused by pets, and to security devices and systems implementing the same.

According to one example, a method comprises detecting a motion event in a scene using a motion detector, based on detecting the motion event, activating an image capture device to acquire a plurality of images of the scene, applying a motion detection process to the plurality of images to detect motion in the scene, applying an object detection process to at least one image of the plurality of images to detect an object in the scene, pairing the motion with the object to locate a moving object, identifying the moving object as a pet, and based at least in part on identifying the moving object as a pet, deactivating the image capture device.

Various examples of the method may include any one or more of the following features.

In one example, applying the motion detection process to the plurality of images to detect the motion includes processing multiple consecutive image frames. In one example, processing the multiple consecutive image frames includes applying a Kalman filter to the multiple consecutive image frames. In another example, processing the multiple consecutive image frames includes converting each image frame of the multiple consecutive image frames to greyscale to produce multiple consecutive greyscale image frames, comparing pixel intensities between the multiple consecutive greyscale image frames, and detecting the motion based on differences in at least some of the pixel intensities between the multiple consecutive greyscale image frames exceeding a predetermined threshold value.

In one example, detecting the motion event includes detecting the motion event using a passive infrared sensor.

In another example, applying the motion detection process includes producing a first bounding box identifying a location of the motion in the at least one image, wherein applying the object detection process includes producing a second bounding box identifying a location of the object in the at least one image, and wherein pairing the motion with the object includes determining that the first bounding box and the second bounding box at least partially overlap.

The method may further comprise, based on identifying the moving object as a pet and prior to deactivating the image capture device, acquiring at least one additional image of the scene, applying the motion detection process to the at least one additional image to confirm detection of the motion in the scene, applying the object detection process to the at least one additional image to confirm detection of the object in the scene, and confirming identification of the moving object as a pet.

In one example, applying the object detection process includes applying an adaptive neural network.

According to another example, a method comprises detecting a motion event using a motion detector, based on detecting the motion event, activating an image capture device, acquiring a first set of images of a scene with the image capture device, processing the first set of images to detect a moving object in the scene, identifying the moving object as a pet, based on identifying the moving object as a pet; acquiring a second set of images of the scene with the image capture device, processing the second set of images to confirm detection of the moving object, based on processing the second set of images, confirming identification of the moving object as a pet, and based on confirming the identification of the moving object as a pet, deactivating the image capture device.

Examples of the method may include any one or more of the following features.

In one example, processing the first set of images includes applying a motion detection process to the first set of images to detect motion in the scene, applying an object detection process to the first set of images to detect an object in the scene, and pairing the motion with the object to detect the moving object. In one example, applying the motion detection process and applying the object detection process each includes applying a Kalman filter to the first set of images. In another example, applying the motion detection process includes producing a first bounding box identifying a location of the motion in the scene, wherein applying the object detection process includes producing a second bounding box identifying a location of the object in the scene, and wherein pairing the motion with the object includes determining that the first bounding box and the second bounding box at least partially overlap. In another example, processing the second set of images includes applying the motion detection process to the second set of images to confirm detection of the motion in the scene, and applying the object detection process to the second set of images to confirm detection of the object in the scene.

According to another example, a sensor comprises a motion detector configured to detect motion events, an image capture device, at least one processor, and a data storage device. The data storage device stores instructions that when executed by the at least one processor configure the sensor to detect a motion event using the motion detector, based on detecting the motion event, activate the image capture device, acquire a plurality of image frames of a scene using the image capture device, apply a motion detection process to the plurality of image frames to detect motion in the scene, apply an object detection process to at least one of the image frames to detect an object in the scene, pair the motion with the object to locate a moving object, determine a classification of the moving object, and take a response action based on the classification of the moving object. To take the response action, the sensor is configured to trigger an alarm based on the classification of the moving object corresponding to a person, control the image capture device to record a video sequence based on the classification of the moving object corresponding to an unrecognized object, and deactivate the image capture device based on the classification of the moving object corresponding to a pet.

Examples of the sensor may include any one or more of the following features.

In one example, the data storage device further includes instructions that when executed by the at least one processor cause the sensor to operate in a low power mode of operation in which the image capture device is deactivated, detect the motion event while operating in the low power mode of operation, and based on detecting the motion event, operate in a normal mode of operation in which the image capture device is activated.

In another example, the sensor further comprises a battery coupled to the motion detector, the image capture device, the data storage device, and the at least one processor.

In another example, the motion detector is a passive infrared sensor.

In one example, the data storage device further includes instructions that when executed by the at least one processor cause the sensor to, based on applying the motion detection process, produce a first bounding box identifying a location of the motion in the at least one image frame, and based on applying the object detection process, produce a second bonding box identifying a location of the object in the at least one image frame.

In another example, to pair the motion with the object to locate a moving object, the data storage device further includes instructions that when executed by the at least one processor cause the sensor to determine an overlap between the first and second bounding boxes, and pair the motion with the object based on the overlap between the first and second bounding boxes.

In another example, the data storage device further includes instructions that when executed by the at least one processor cause the sensor to, based on the classification of the moving object corresponding to a pet or an unrecognized object and prior to taking the response action, acquire one or more additional image frames of the scene using the image capture device, and process the one or more additional image frames to confirm the classification of the moving object, and based on confirmation of the classification of the moving object, take the response action.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, the same or similar components that are illustrated are represented by a like reference numeral. For purposes of clarity, every component may not be labeled in every figure. In the figures:

DETAILED DESCRIPTION

Figure 1:
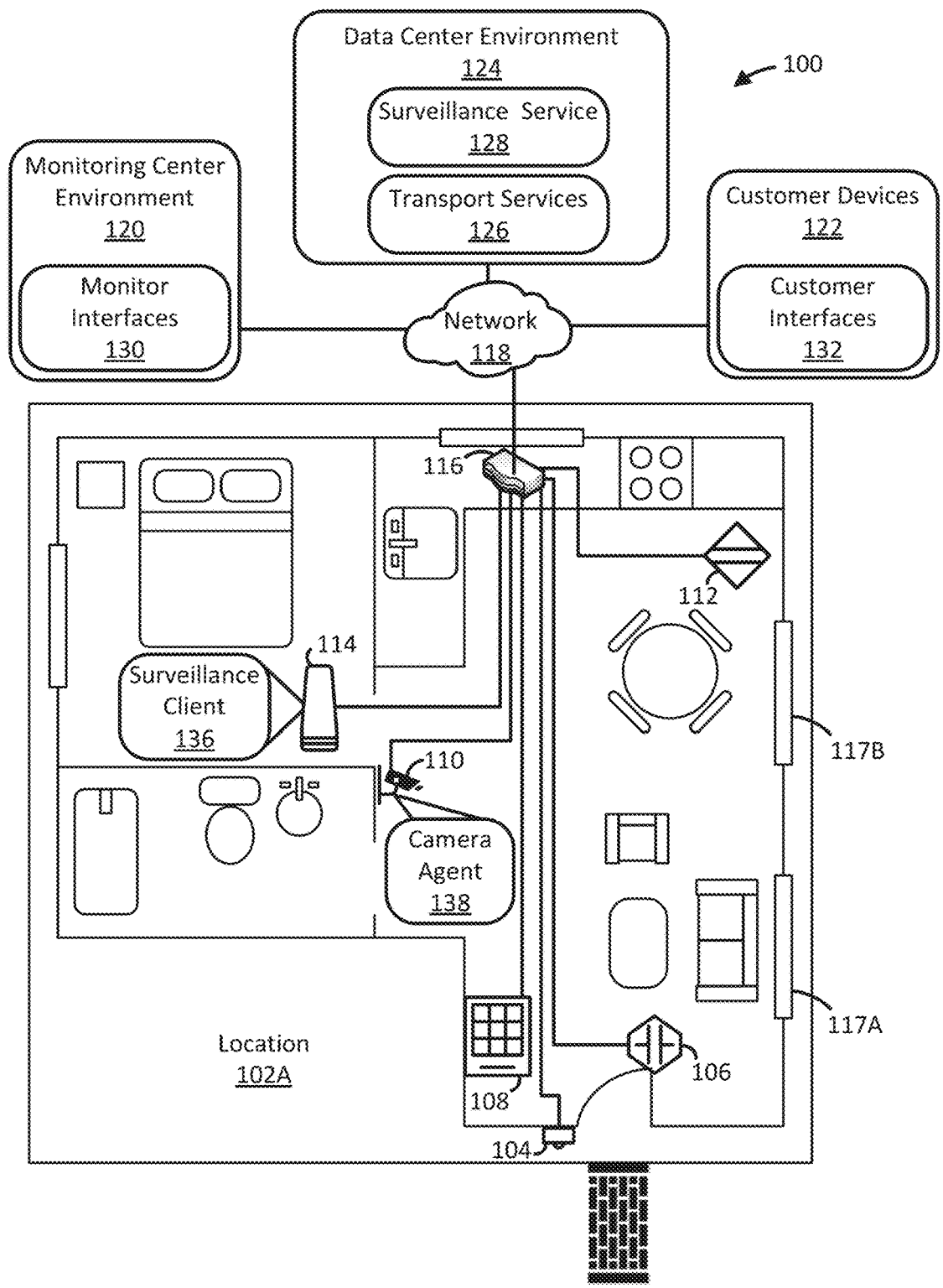
FIG. 1 is a schematic diagram of a security system, according to some examples described herein.

Security systems can include a range of sensors configured to detect various events, such as motion, moisture, temperature changes, and sounds, among others. For example, passive infrared (PIR) sensors are motion sensors that detect changes in temperature in a pre-determined field of view. The PIR sensors can be configured with a threshold such that any change larger than the threshold constitutes motion and causes a motion trigger. Imaging sensors can be capable of distinguishing detecting certain objects, such as people, for example, in captured image frames. The image sensors can be configured to trigger an object detection alert if an object of interest is identified within an image frame. Imaging sensors can use any of a variety of techniques to locate and recognize objects in a frame. For example, computer vision-based object detection can use specialized filters for locating different attributes or features within an image frame and then combining the features to classify whether or not a particular category of object is found. For example, an object detector can locate all human faces in a frame. Recently, machine learning based approaches are used wherein algorithms or models are trained on a vast number of images containing objects of interest to recognize similar objects in new or unseen images.

Aspects and examples are directed to leveraging features and capabilities of motion detectors (such as PIR sensors) and imaging sensors to provide power-efficient, reliable threat detection, while also reducing occurrences of false positive alarms, as discussed in more detail below. Due to limitations of some implementations of motion detection or object detection processes, there are numerous circumstances that tend to generate a high number of false positive alarms. For example, the security sensor may lack sufficient information to determine whether or not the trigger event should cause an alert, and therefore may proceed to trigger the alarm to err on the side of caution. For example, a motion detector may produce an alert in response to a motion event because the motion detector cannot identify whether the motion corresponds to something that should cause an alert (e.g., a person) or something benign (e.g., a moving tree branch). In home security systems, pets represent a common source of false positive alarms.

High numbers of false positive alarms are undesirable for several reasons. For example, receiving many false positive alarms can be annoying and distracting for an owner of the security system. For indoor home security sensors intended to alert authorities for emergency response, it is particularly important to keep false positives to a minimum. Therefore, minimizing false positive alarms caused by pets, for example, is highly desirable. In addition, false positive alarms can cause the security system to use more power because a high rate of alarms causes the electronics of the system, including those that consume relatively high power, such as processors and transmitters, for example, to be active more of the time. This is undesirable in general for environmental and energy-efficiency reasons, and can be even more problematic for battery-powered security sensors where unnecessary activity can shorten the battery life.

To address these and other issues, aspects and examples are directed to techniques for improving security sensors by providing reliable threat detection while decreasing power consumption to save energy and/or extend battery time. In particular, aspects and examples provide techniques for reducing false positive events when pets are detected. For example, certain aspects involve identifying moving objects by combining and pairing results from object detection and motion detection, and classifying the detected moving objects as one of recognized objects not of interest (which may include a particular sub-category of pets), recognized objects of interest, or unrecognized objects. As discussed in more detail below, using a combination of object detection, motion detection, and filtering, certain examples allow for the rejection of detections of known classes of objects that do not constitute threats, including pets, along with evaluation of unrecognized objects to determine whether or not such objects represent a potential threat or not, such that only detection of objects of interest (e.g., people) result in alarm events. Accordingly, the rate of false positive alarms can be reduced, while maintaining a high level of confidence and reliability in detection of potential threats.

Examples of the techniques disclosed herein can be implemented using a sensor (e.g., battery-powered imaging security sensor) including a motion detector configured to detect moving objects, an image capture device (e.g., a camera), a battery, at least one processor, and a data storage device. The data storage device stores instructions that when executed by the at least one processor cause the sensor to operate in a low power mode of operation in which the image capture device is deactivated. During the low power mode of operation, the sensor is configured to detect a motion event using the motion detector, and based on detecting the motion event, to be configured into a normal (or active) mode of operation in which the image capture device is active. In the normal mode of operation, the sensor is configured to acquire a plurality of image frames using the image capture device, to process the image frames to locate an object that triggered the motion event, and to classify the object into one of a plurality of categories, the plurality of categories including an object of interest category, an unknown moving object category, and a pet category. In some examples, the categories may include a non-interest category, which may be in addition to the pet category, or pets may fall within the non-interest category. Based on classifying the object, the sensor can be configured to take one of a plurality of response actions. The response actions can include, based on classifying the object into either the object of interest category or the unknown moving object category, triggering an alert, or based on classifying the object into the non-interest or pet category, reconfiguring the sensor into the low power mode of operation.

These and other features and examples are discussed in more detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center 120, the data center 124, the one or more customer devices 122, and the communication network 118 include one or more computing devices (e.g., as described below with reference to FIG. 11). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CMDA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g., via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIG. 4B). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alert condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alert condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
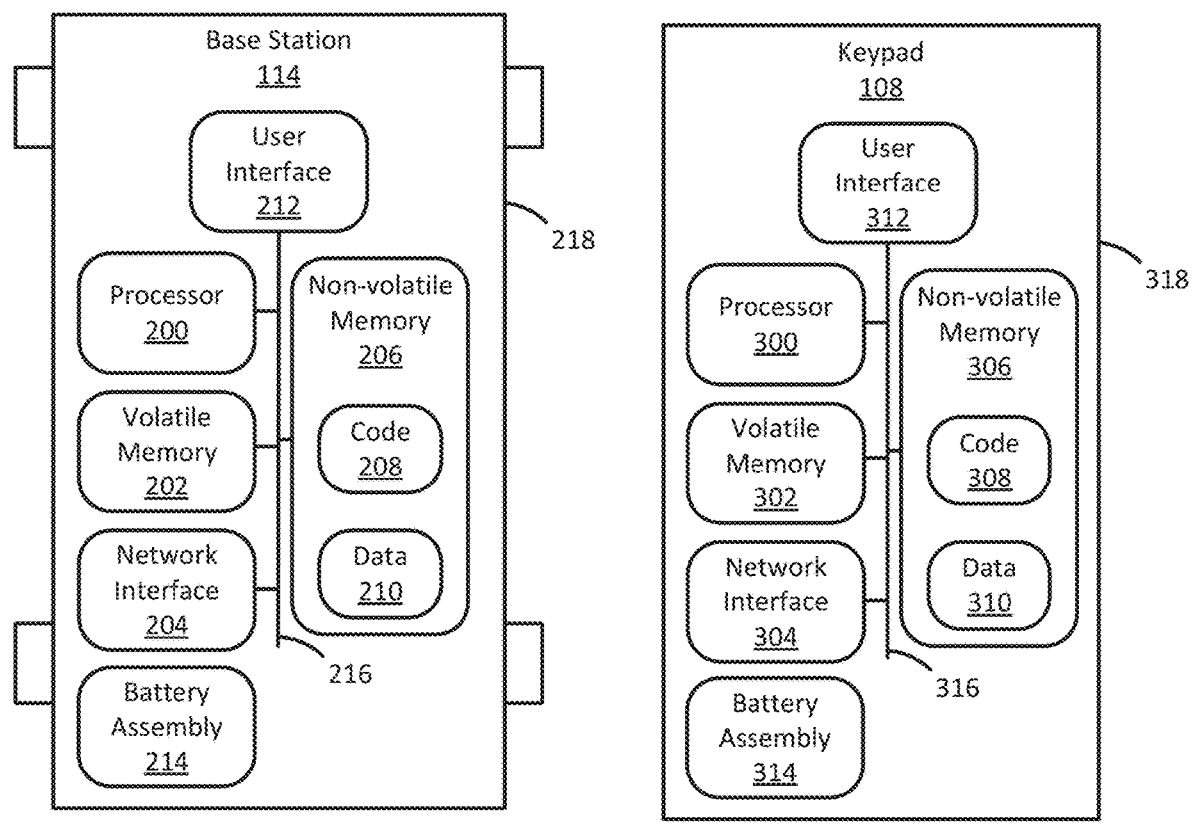
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random-access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit wake messages to the other computing devices to request streams of sensor data or other operations. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

Figure 4A:
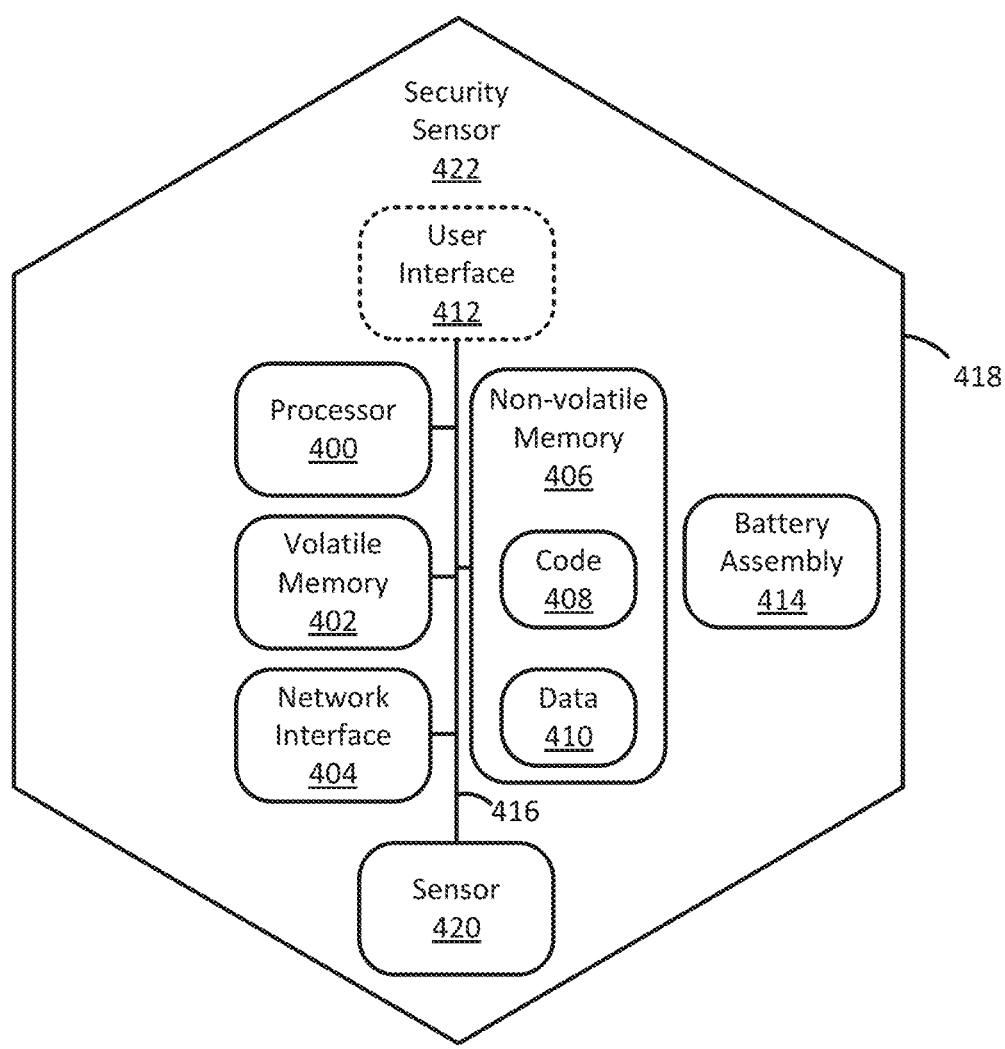
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and a temperature or thermographic sensor (e.g., an active and/or passive infrared sensor). sensor. Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
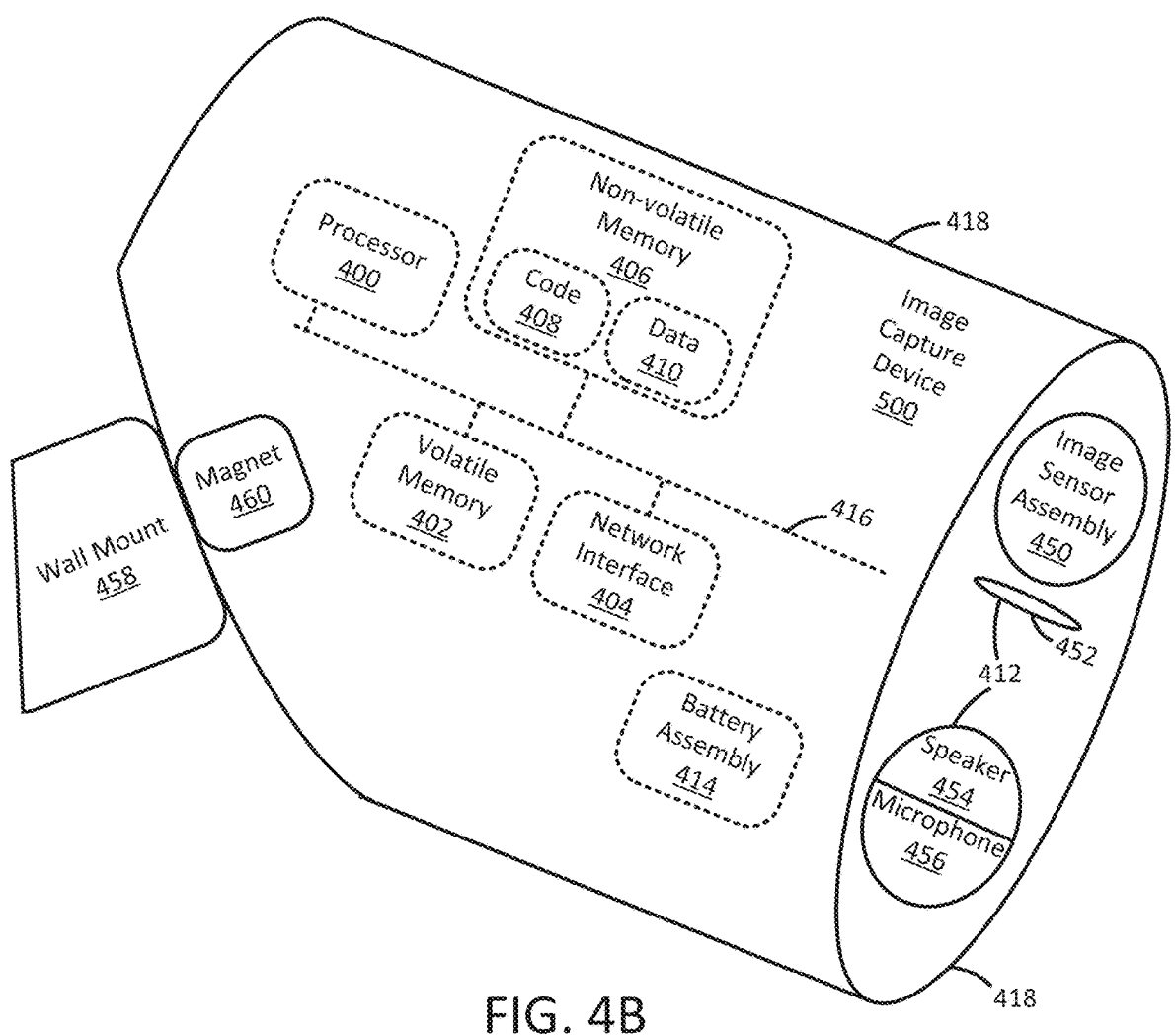
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor. The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be stream to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alert via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A.

Figure 5:
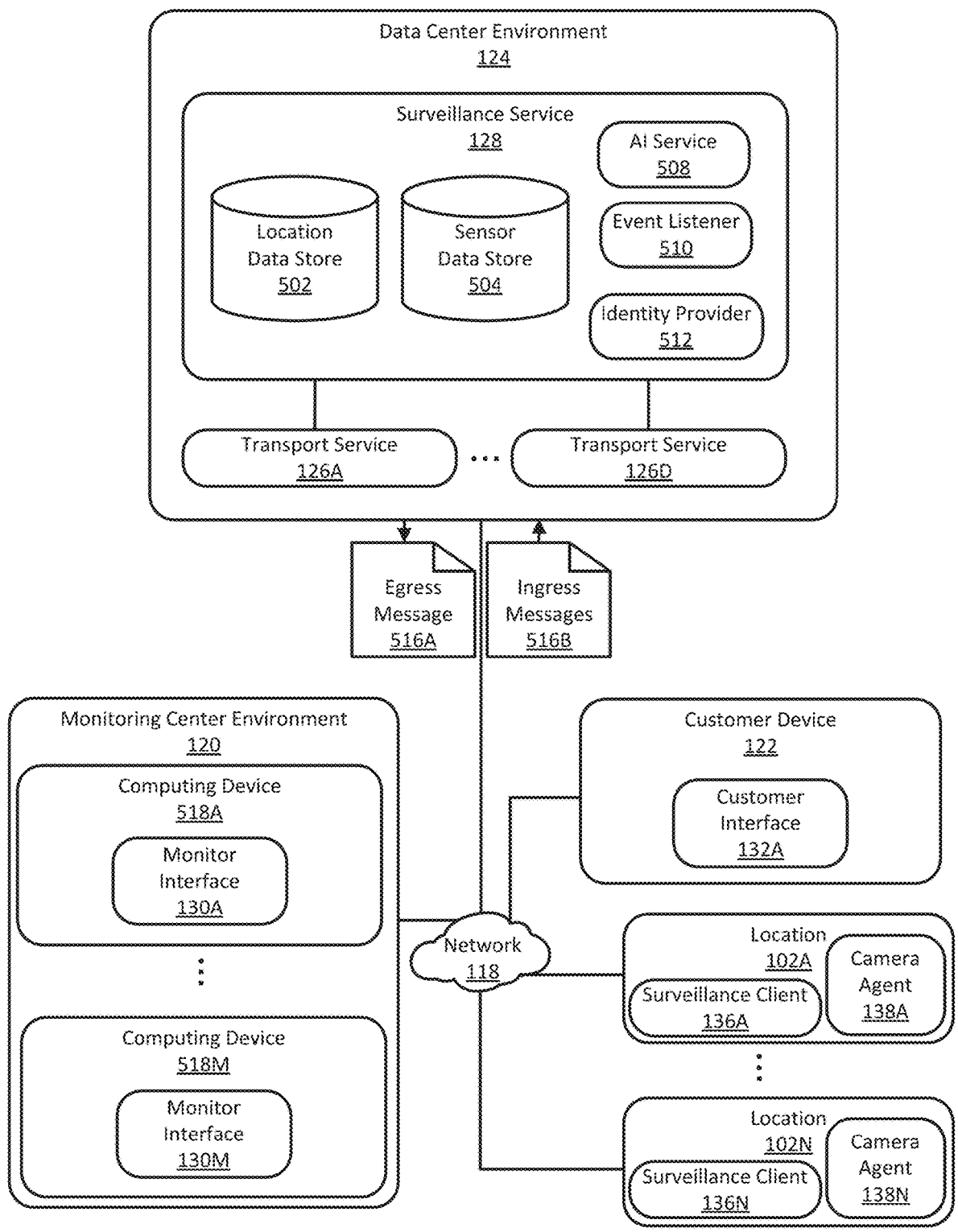
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A of FIG. 1 through 102N (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) in association with identifiers of locations and timestamps at which the sensor data was acquired.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for events and, where an event is identified, execute one or more event handlers to process the event. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events within sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
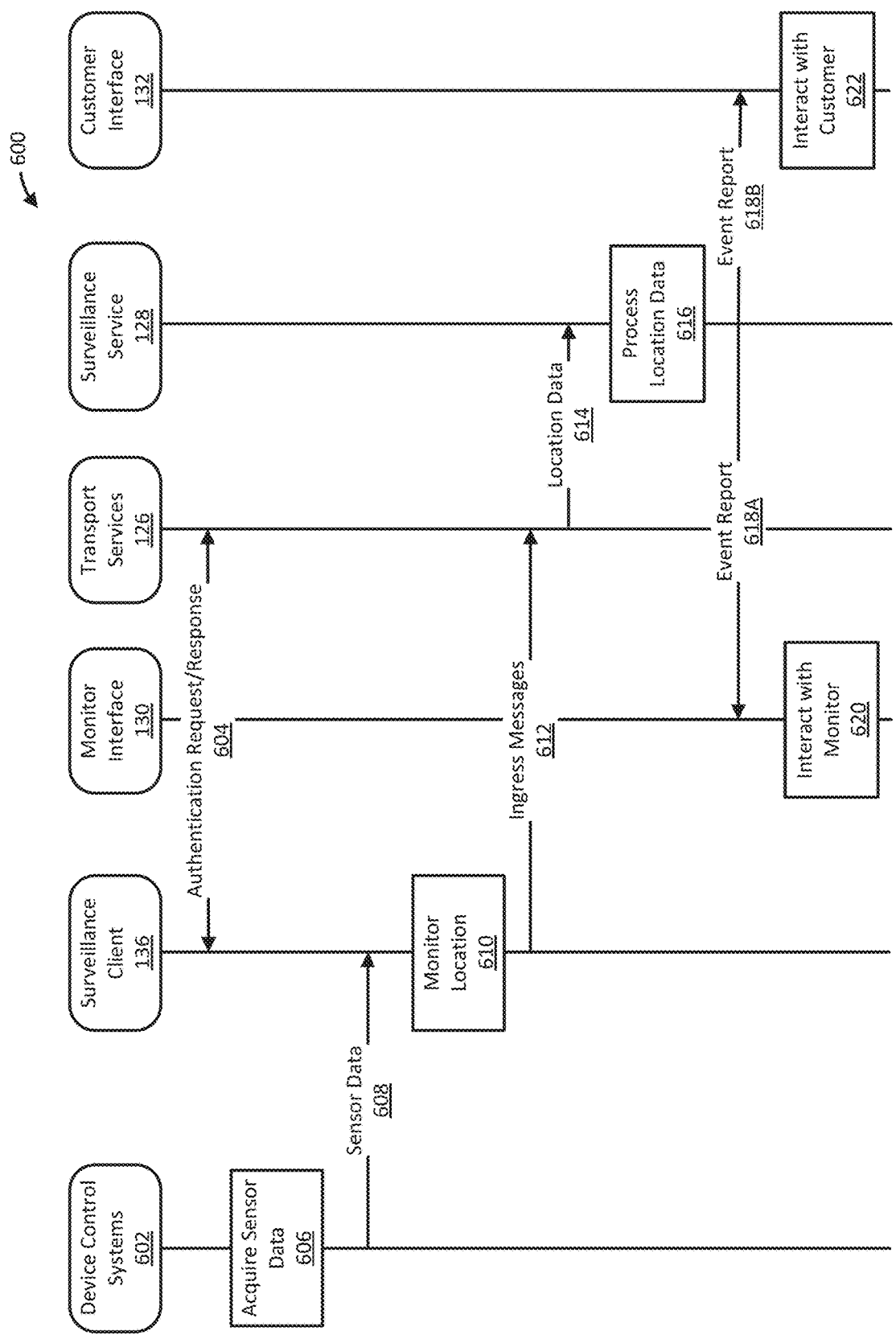
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIG. 3 or 4). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the transport service 126 generates a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alerts (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
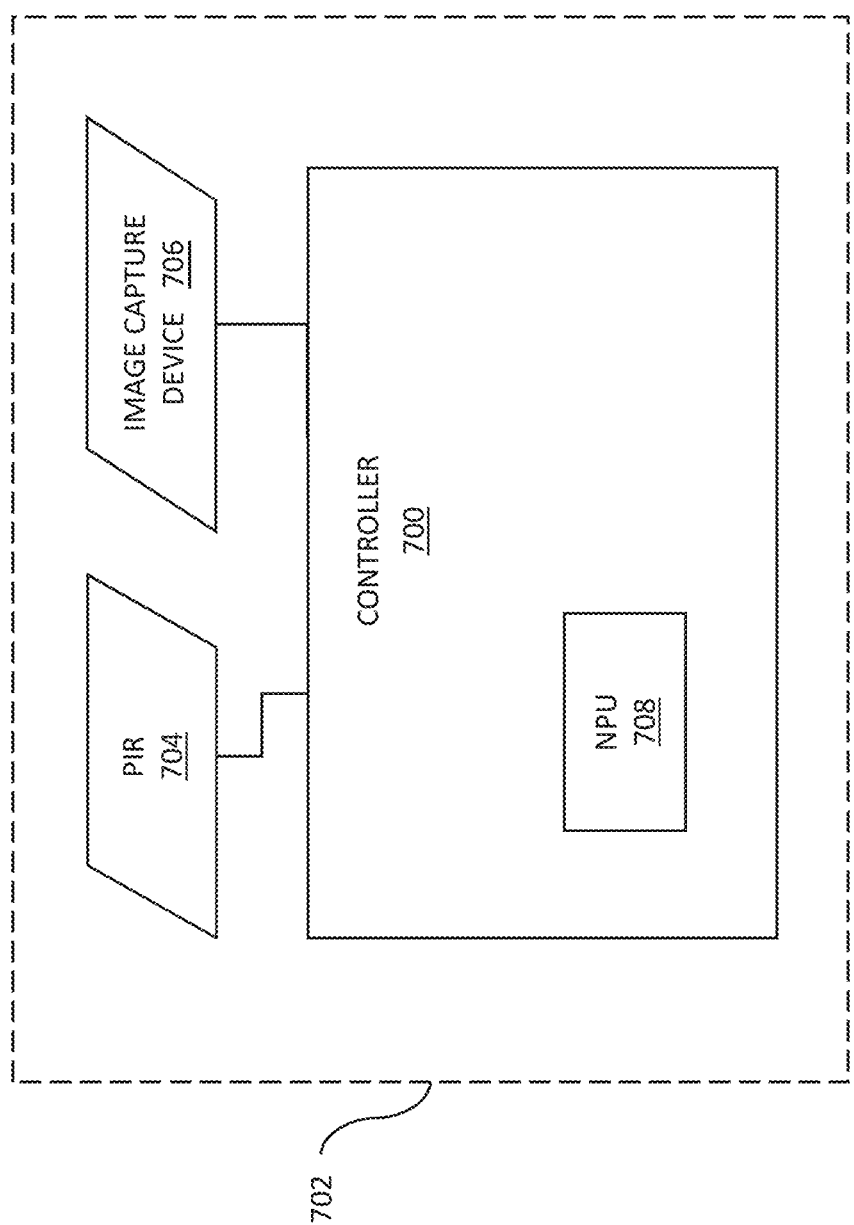
FIG. 7 is a schematic diagram of one example of a sensor according to some examples described herein.

Turning now to FIG. 7, there is illustrated an example of a sensor 702 configured to implement various techniques disclosed herein. The sensor 702 can be associated with a security system installed at a monitored location, as discussed above. The sensor 702 includes a motion detector 704 and an image capture device 706 that are electrically coupled to a controller 700. The controller 700 may include or may be implemented by one or more processors, such as the processor 400 discussed above, for example. The sensor 702 may further include any of the componentry and functionality of the security sensor 418 and/or image capture device 500 discussed above with reference to FIGS. 4A and 4B. Accordingly, it will be understood that the sensor 702 may include components not shown in FIG. 7.

In one example, the motion detector 704 is a PIR motion detector. In one example, the image capture device 706 is a digital camera that collects still image frames and/or video image frames constituting a video feed/stream. The image capture device 706 may include the image sensor assembly 450 discussed above with reference to FIG. 4B. In one example, the controller 700 includes a neural processing unit (NPU) for efficiently running neural networks to perform aspects of motion detection and object detection processes based on the image frames captured by the image capture device 706, as discussed in more detail below. The sensor 702 may be a battery-powered indoor sensor configured to be installed and operated in an indoor environment, such as within a home, office, store, or other commercial or residential building, for example.

According to certain examples, the controller 700 and the motion detector 704 operate in a low power state, or operating mode, in the image capture device 706 (and optionally other components of the sensor 702) are deactivated, until an event triggers the motion detector 704. In the low power operating mode, the motion detector 704 remains active, but components that generally consume more power, such as the image capture device 706, for example, are powered off. In the low power operating mode, the controller 700 performs minimal processing, sufficient to monitor for events that trigger the motion detector 704. When the motion detector 704 indicates motion and issues a signal or notification (e.g., sends a motion trigger report to the controller 700), the controller 700 is placed into a normal operating mode, in which the image capture device 706 (along with any other components of the sensor 702 that are powered off in the low power state) is enabled. Thus, the motion detector 704 acts as a mode "switch" that configures the sensor 702 into the "full power" or normal operating mode only when necessary. In this manner, power can be conserved by operating the sensor 702 in the low power mode, with various components powered off, until a potential event of interest is detected.

Figure 8:
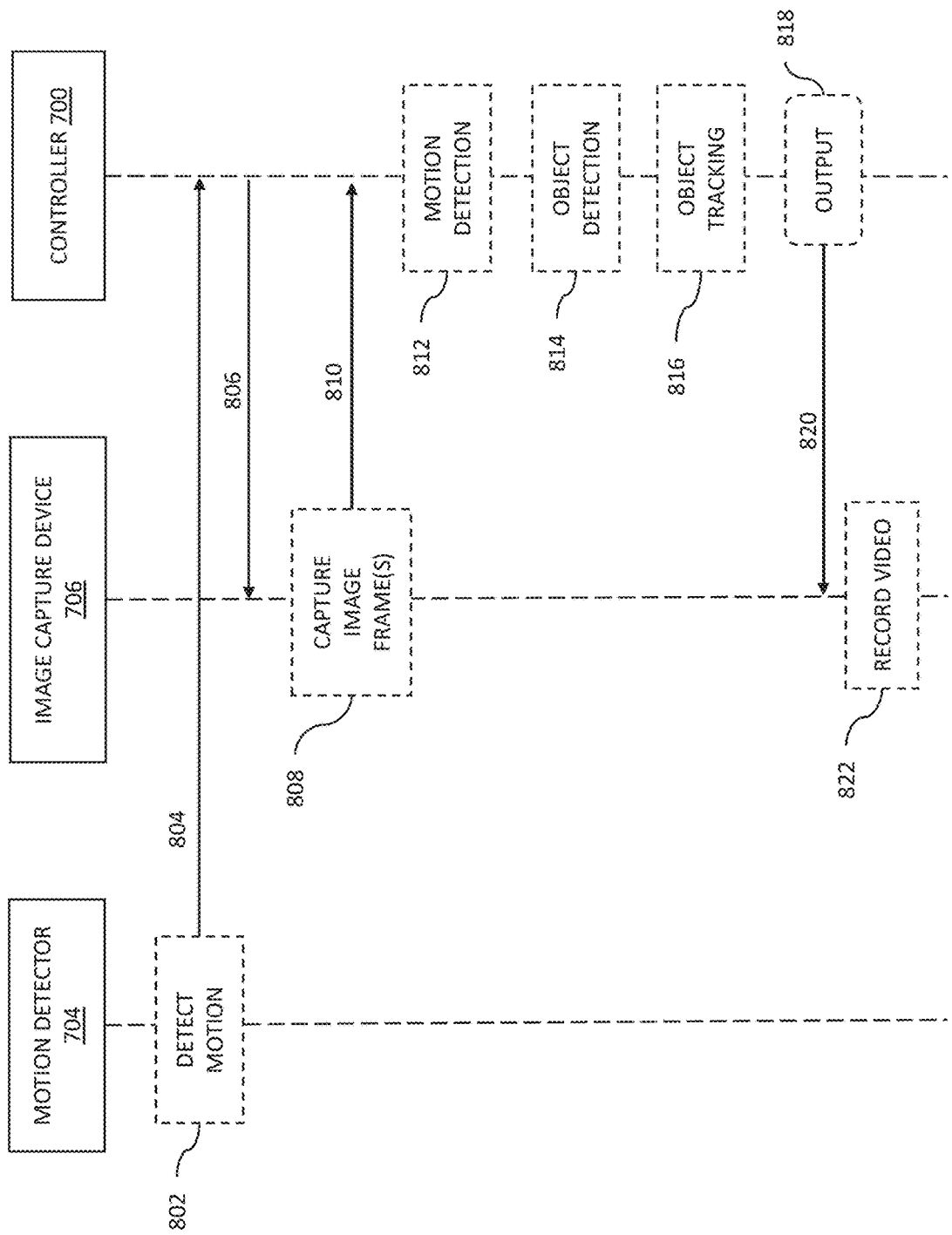
FIG. 8 is a sequence diagram illustrating an example of operation of the sensor of FIG. 7 according to some examples described herein.

Referring to FIG. 8, there is illustrated a sequence diagram corresponding to an example of operation of the sensor 702 of FIG. 7. With the sensor 702 operating in the low power mode, the motion detector 704 is active. At 802, the motion detector 704 detects an event (e.g., an object in motion) and sends a signal (e.g., motion trigger report) to the controller 700, as indicated at 804. As discussed above, in certain examples the motion detector 704 is a PIR sensor that detects motion based on detected changes in temperature over its field of view. Accordingly, in some examples, the motion sensor 704 can be tuned to detect people and/or animals based on a known temperature range associated with the body temperatures of people/animals. The signal from the motion detector 704 causes the controller 700 to configure the sensor 702 into the normal operating mode, which includes activating or enabling the image capture device 706, as indicated at 806. Once active, at 808, the image capture device 706 captures one or more frames of image data. In some examples, the image capture device 706 passes the frame(s) of image data ("images" or "image frames") to the controller 700 for processing, as indicated at 810.

According to certain examples, the controller 700 applies a motion detection process 812 that operates on the captured frames of image data from the image capture device 706 to detect instances of motion. Examples of the motion detection process 812 are discussed further below with reference to FIGS. 9A and 9B. In the example shown in FIG. 8, the motion detection process 812 is implemented by the controller 700. In other examples, the motion detection process 812 is implemented by a combination of the image capture device 706 and the controller 700. The controller 700 is further configured (optionally in combination with the image capture device 706) to implement an object detection process 814. Examples of the object detection process 814 are discussed below with reference to FIGS. 9A and 9B. The controller 700 is further configured to perform a post-processing step 816 on the outputs of the motion detection process 812 and the object detection process 814 to track and categorize detected objects, as discussed in more detail below. Based on applying the motion detection process 812, the object detection process 814, and the object tracking post-processing 816 to the captured image frames 808, the controller 700 produces different classes of output 818. Depending on the class of output 818, the sensor 702 can take different actions. For example, the controller 700 can be configured to generate three classes of output 818: recognized moving objects (recognized objects paired with motion), stationary objects (detected objects that are not paired with motion), and "unknown motion" (detected motion that is paired with an unrecognized object). In examples, detection of stationary objects or of recognized moving objects that are not deemed to represent a threat will not cause the sensor 702 to trigger an alarm. Instead, the controller 700 may deactivate the image capture device 706, and the sensor 702 may return to the low power state until the motion detector 704 detects a new instance of motion. In particular, as discussed further below, the sensor 702 can be tuned to recognize pets as objects that do not represent a threat and therefore will not cause triggering of an alarm. Detection of recognized moving objects that may represent a threat (such as people, for example) may cause the sensor 702 to trigger an alarm. In examples, based on detection of unknown motion, the controller 700 instructs the image capture device 706 (indicated at 820) to begin recording a video sequence at 822. The video sequence can be reviewed by a human operator (or a device hosting an artificial intelligence process) to determine whether or not an alarm should be triggered, as discussed further below.

Figure 9A:
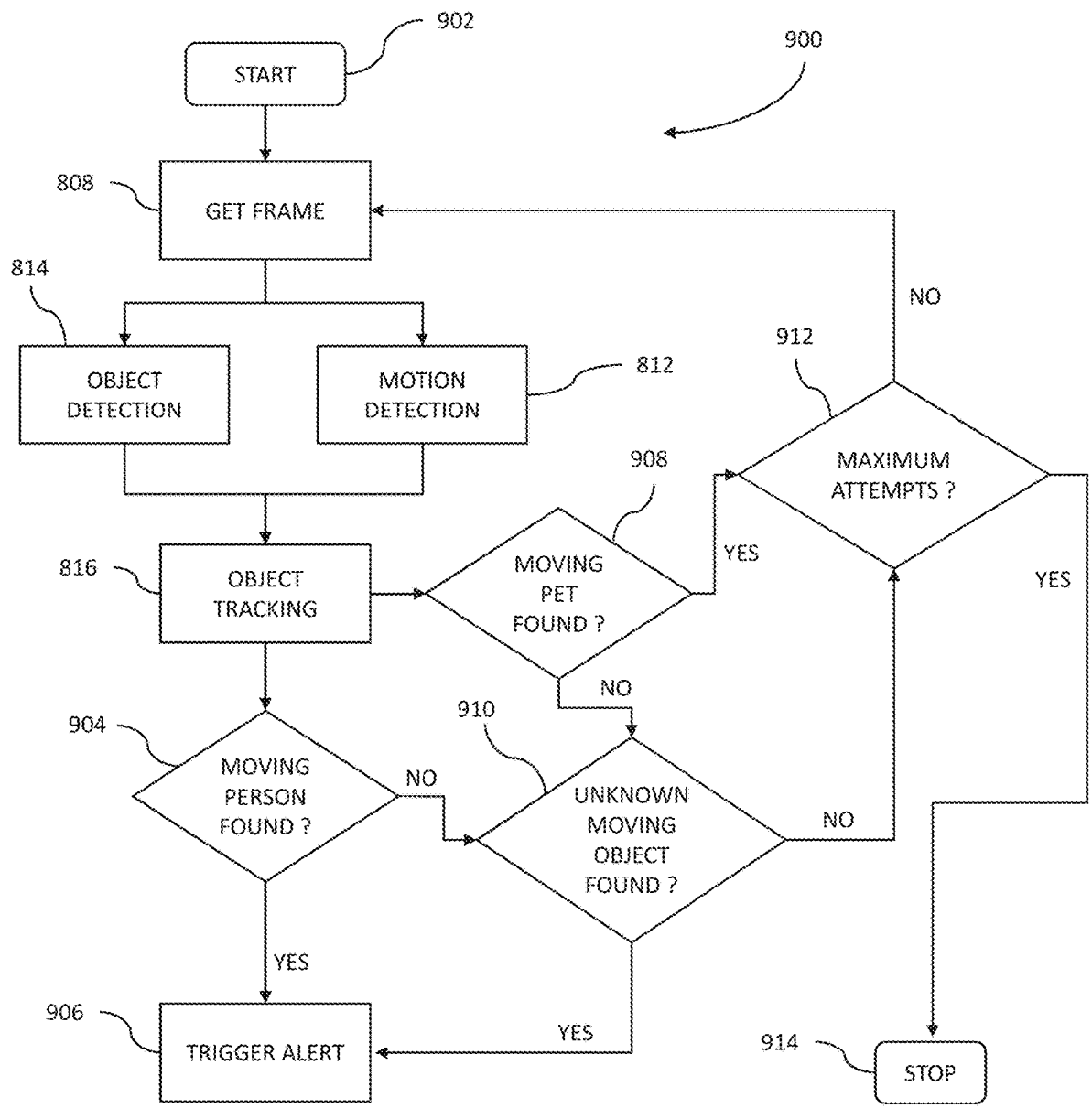
FIG. 9A is a flow diagram of one example of an image processing methodology according to some examples described herein.
Figure 9B:
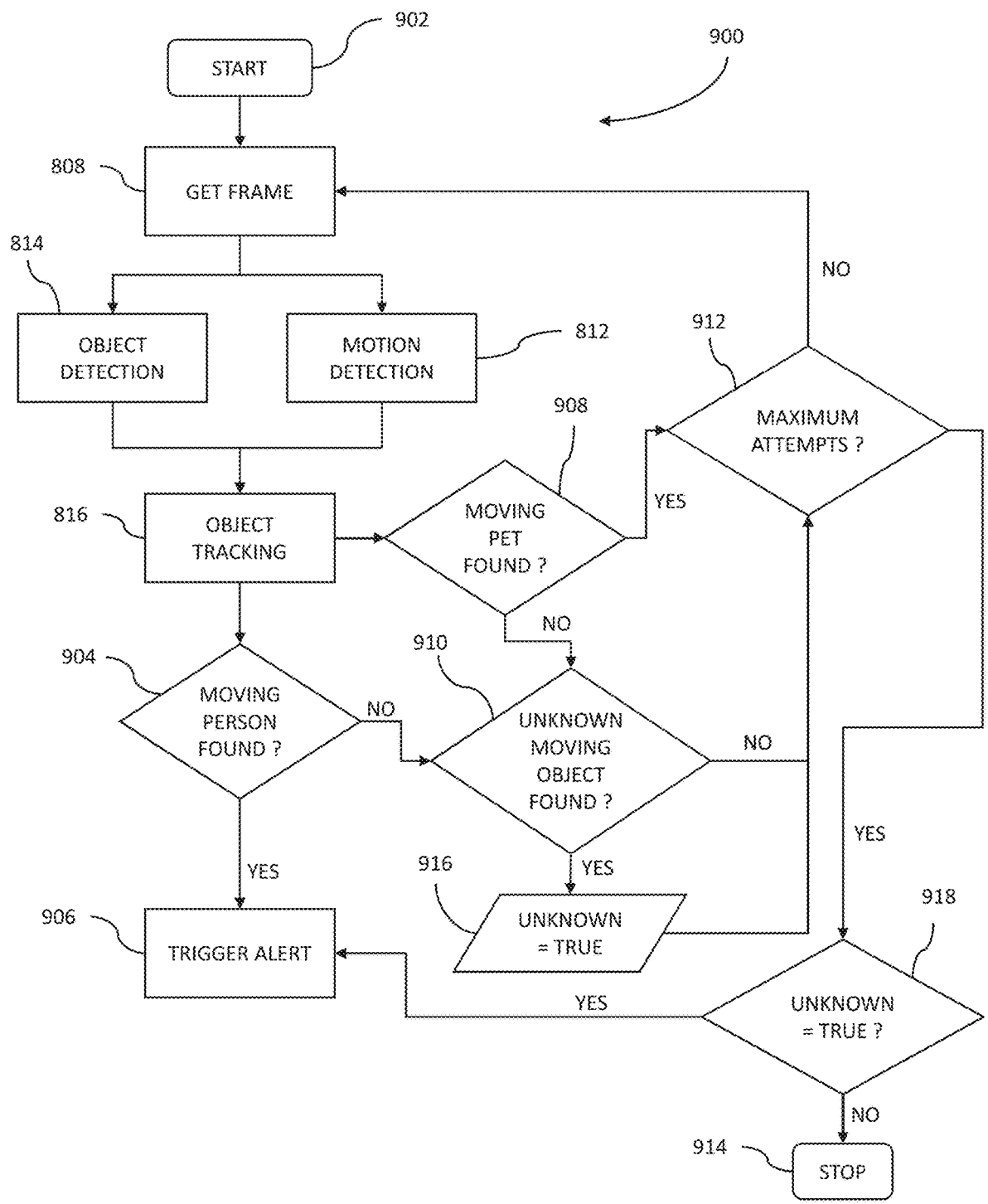
FIG. 9B is a flow diagram of another example of the image processing methodology of FIG. 9A according to some examples described herein.

FIGS. 9A and 9B illustrate flow diagrams of examples of a monitoring methodology that can be implemented using the sensor 702 and processes discussed above with reference to FIG. 8. Referring to FIG. 9A, the process 900 begins at 902 when motion is detected by the motion detector 704. At 808 a frame of image data is obtained by the image capture device 706, as discussed above with reference to FIG. 8. Further frames of image data can be acquired by the image capture device 706 as the process 900 continues and repeats various actions as discussed below. In examples, a single frame is read from the image capture device 706 at a time. The frame is converted to greyscale and resized for motion detection. In one example, the greyscale frame is resized to 320×192 pixels for motion detection; however, in other examples, other frame sizes can be used. The frame is also converted to red-green-blue (RGB) color format and resized for object detection. In one example, the RGB frame is resized to 512×288 pixels for object detection; however, in other examples, other frame sizes can be used. In some examples, downsizing the image frames may allow the images to be processed more quickly (e.g., using an adaptive neural network as discussed below) and/or with less power consumption (which may be particularly beneficial for battery powered sensors) than if the motion and/or object detection processes were applied to full-size images captured by the image capture device 706.

The process 900 includes performing the motion detection process 812 to detect instances of motion in the image data, and performing the object detection process 814 to locate and identify one or more objects in the image data. In examples, the motion detection process 812 operates on multiple frames (e.g., consecutive frames) of image data captured by the image capture device 706. In some examples, the motion detection process 812 is configured to locate where the moving object is in the field of view of the image capture device 706. The field of view of the image capture device 706 corresponds to the extent of the observable world that is "seen" at any given moment by the image capture device, which is generally the solid angle through which the image capture device is sensitive to electromagnetic radiation. Location of the object within the field of view can be accomplished using computer vision techniques. For example, there are existing foreground detection processes that can be used to locate moving objects in a frame of image data. Thresholding techniques can be employed along with comparing consecutive frames of image data to detect changes (e.g., above a certain threshold) in pixel intensities from frame to frame, with such changes potentially indicating motion.

The object detection process 814 operates on individual frames of image data captured by the image capture device 706. In some examples, the image capture device 706 continues to collect further frames of image data during operation of the motion detection process 812 and/or the object detection process 814. Once the object detection process 814 is initiated, it can be run in parallel with the motion detection process 812. Running the motion detection process 812 and the object detection process 814 in parallel may provide the benefit of determining more quickly whether or not an alarm should be triggered, as discussed further below. In other examples, the motion detection process 812 may be run, followed by the object detection process 814, or vice versa. Accordingly, the positions of the motion detection process 812 and the object detection process 814 in FIGS. 8, 9A, and 9B are not intended to limit operation of these processes to any particular order or timing sequence.

Inside of a typical home there is a small set of objects that may move. Usually items like ceiling fans or box fans, window blinds (from wind), robotic vacuum cleaners, etc., can cause motion. However, the motion of these objects may not be detected by the motion detector 704 (e.g., where the motion detector is a PIR sensor), and therefore, their motion alone may not cause the process 900 to begin at 902. To the extent that motion from these (or similar) objects is detected by the motion detection process 812, such false positives can be filtered out during the object detection process 814 as these objects can be classified as objects not of interest.

As discussed above, in home security systems, pets can cause a significant number of false positive alarms. Certain pets, such as turtles, fish, or birds, to name a few, are generally confined to cages and their location within a home does not frequently change. Security cameras can therefore be set up such that the cages containing these types of pets are not within the camera's field of view, and therefore the motion of these pets is not detected and does not trigger an unwanted alarm. However, other pets, such as cats and dogs, for example, are often allowed to roam freely within a home, and therefore their motion can cause false positive alarms when detected by security sensors. In particular, large dogs may have a temperature profile similar to people and may therefore trigger the motion detector 704. Once the image capture device 706 is activated, the dog and its motion may be detected by the object detection process 814 and the motion detection process 812. Accordingly, to address this issue, examples of the methodology and the associated sensors disclosed herein can be configured to identify motion events that are associated with pets and prevent alarms from being triggered in response to pet-related motion detection. For example, as discussed above, the object detection process 806 can be configured to detect whether one or more of a set of objects is present in a frame of image data. In certain examples, one of these sets of objects corresponds to pets and is classified as a set not of interest. Specifically, in some examples, dogs and/or cats can be identified as objects that are not of interest. The specificity or granularity with which pets are identified in the object detection process 806 may be determined by the image processing techniques used and may be configurable. For example, the imaging security sensor 702 can be configured to perform the object detection 806 based on machine learning processes that are taught to recognize certain pets based on a large set of training data. In some instances, during set-up or installation of the imaging security sensor within a home security system, the type of pet inhabiting the home can be identified, and the sensor can be configured to execute machine learning processes to identify that type of pet (e.g., dogs only, cats only, or cats and dogs) as an object not of interest.

Figure 10A:
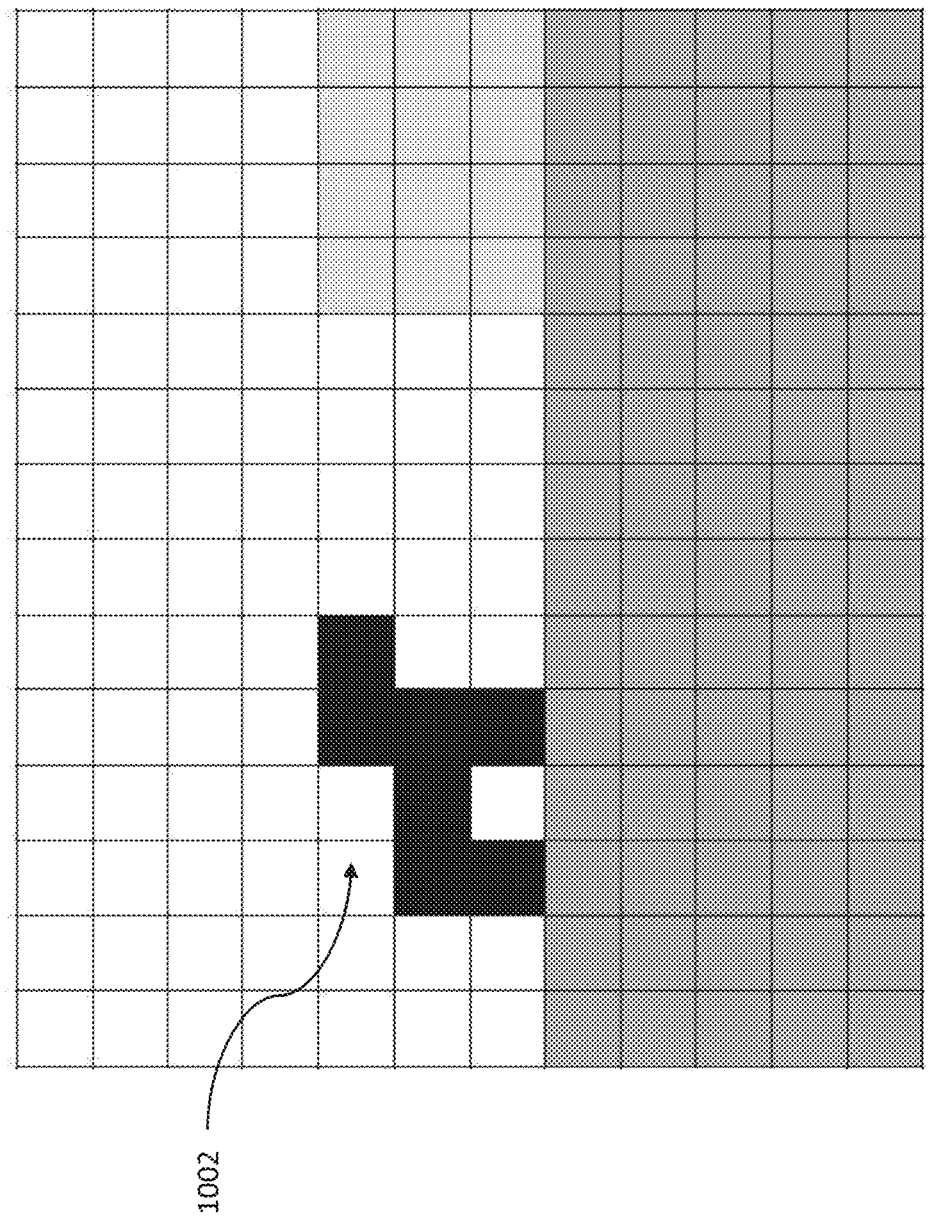
FIG. 10A is a diagram illustrating an example of a frame of image data according to some examples described herein.
Figure 10B:
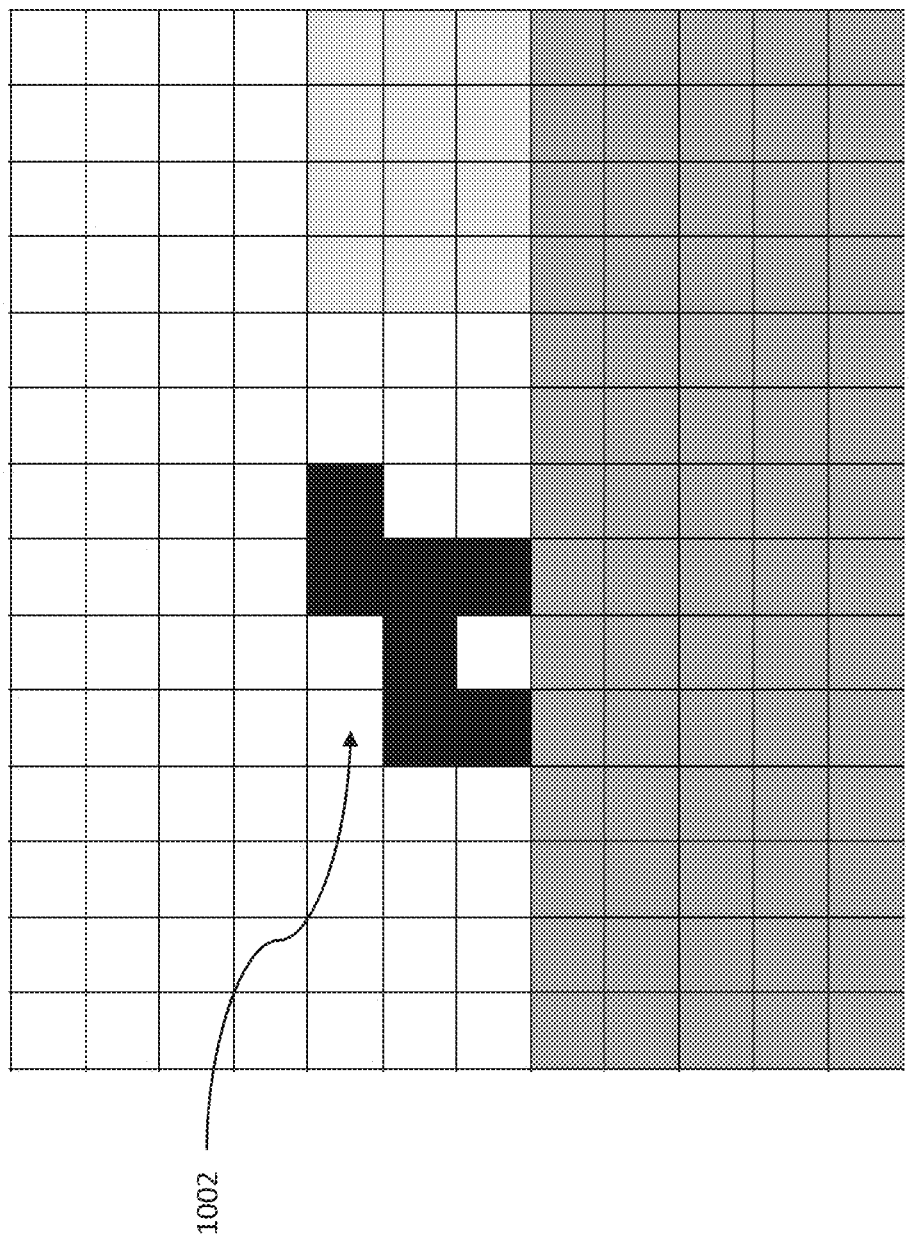
FIG. 10B is a diagram illustrating another example of a frame of image data according to some examples described herein.
Figure 10C:
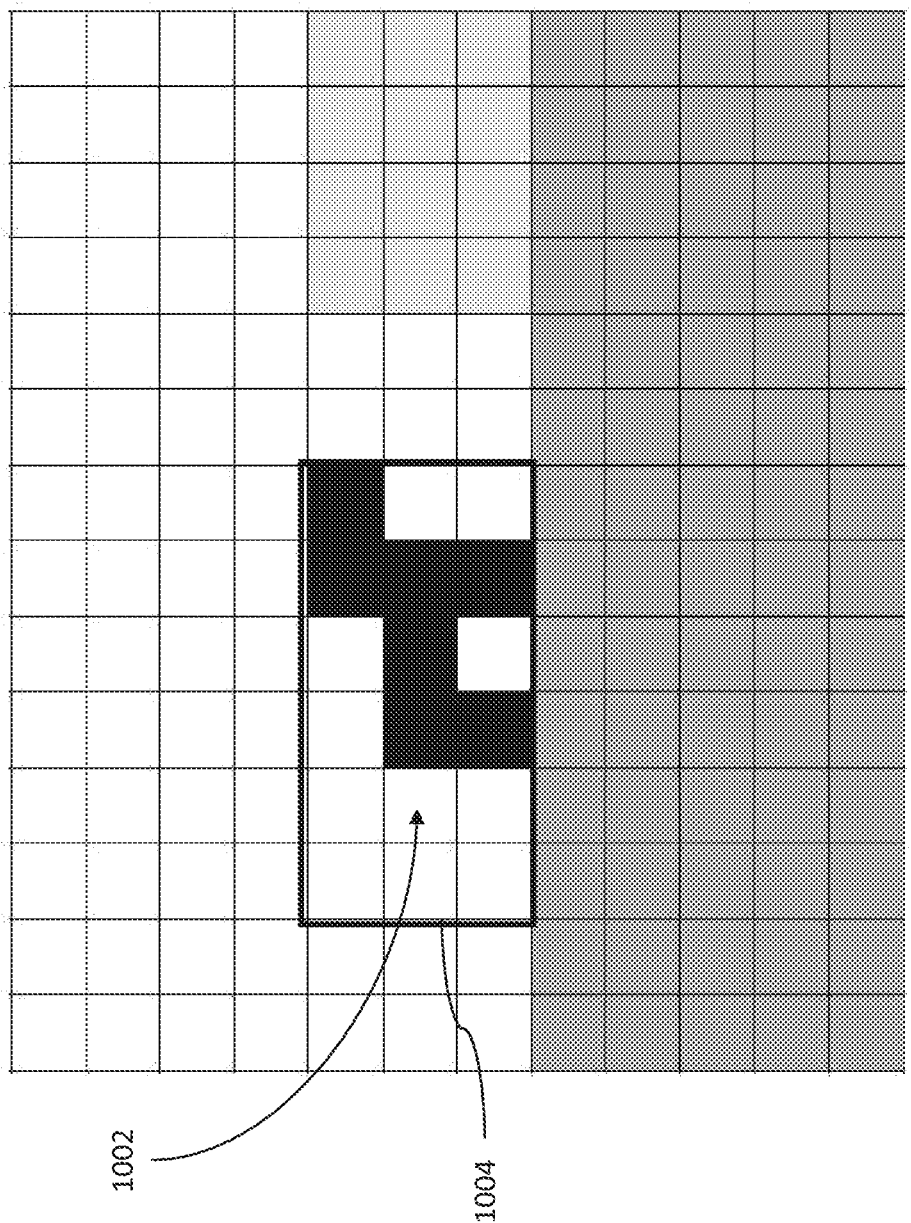
FIG. 10C is a diagram illustrating an example of the frame of image data of FIG. 10B including a motion detection bounding box according to some examples described herein.

FIGS. 10A and 10B illustrate an example of consecutive greyscale image frames in which a moving pet 1002 is detected. As may be seen by comparing FIGS. 10A and 10B, in the subsequent image frame of FIG. 10B, the pet 1002 has moved two pixels to the right relative to their location in the first image frame of FIG. 10A. The background in the image frames has not changed. In examples, the motion detection process 812 compares consecutive frames, such as those shown in FIGS. 10A and 10B, and produces a list of one or more bounding boxes 1004 (see FIG. 10C, for example) where the pixels have changed. The motion detection process can be tuned to reject noise (e.g., by using thresholding to reject small differences between consecutive image frames). Thus, the output of the motion detection process 812 includes one or more bounding boxes 1004 describing the location of detected motion within the scene.

Figure 10D:
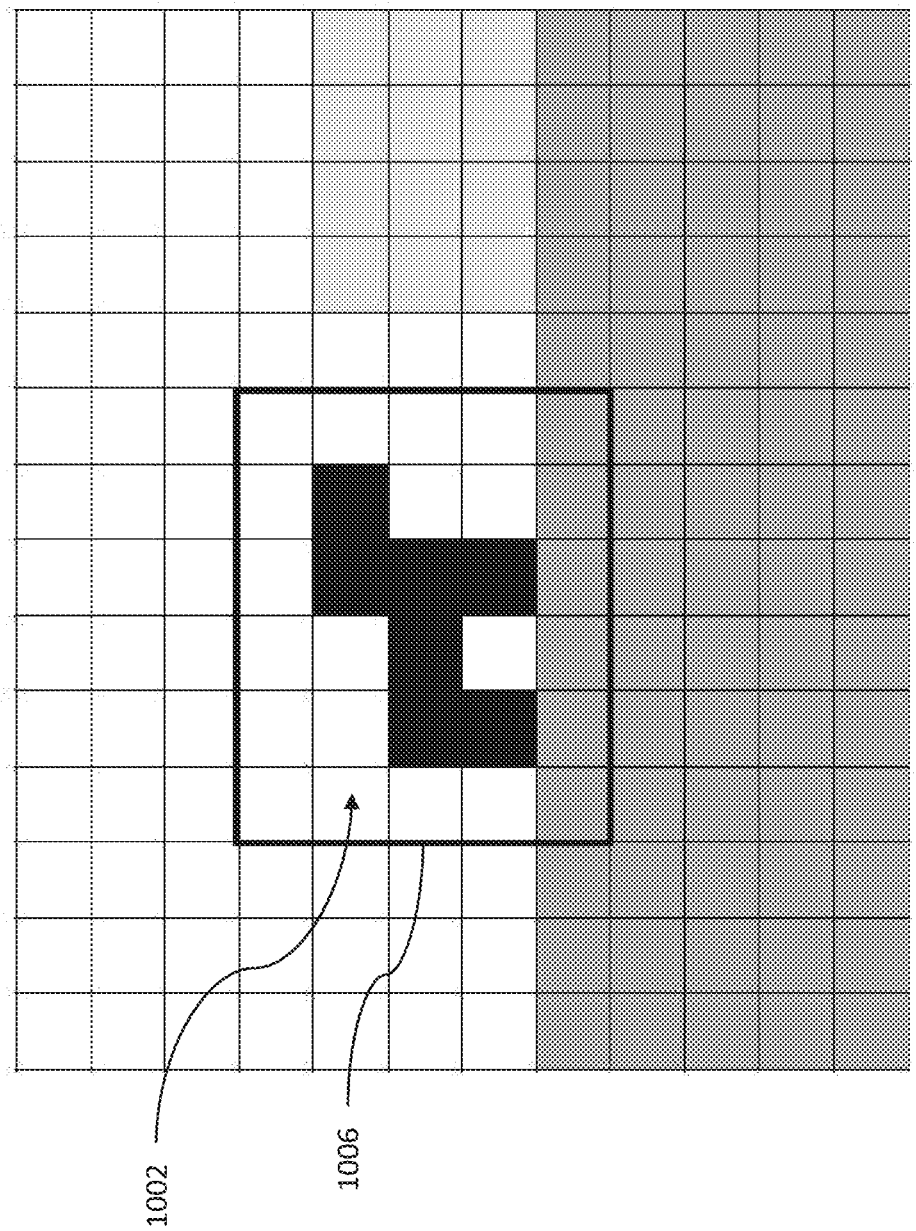
FIG. 10D is a diagram illustrating an example of the frame of image data of FIG. 10B including an object detection bounding box according to some examples described herein.

As discussed above, the object detection process 814 detects whether one or more types of objects are in the scene represented by the frame of image data. In examples, the object detection process 814 detects one or more of a predetermined set of objects (e.g., people, cats, dogs, vehicles, trees, etc.) are present in the scene. In some examples, the object detection process 814 can be accomplished using an artificial neural network (ANN) that is trained to identify only specific objects of interest. The ANN may be implemented in software (e.g., as part of the NPU 708), hardware, or a combination of both. The ANN may be configured to perform any of various known methods of identifying objects in images. In examples, the output of the object detection process 814 is a bounding box 1006 outlining the detected object 1002 (see FIG. 10D, for example) and describing where the object is located in the scene. The output of the object detection process 814 may also include a group identifier that identifies the type of object detected. For example, the group identifier can indicate whether the detected object is a person, a pet, a vehicle, or another object either of interest or not of interest. In one example, the group identifier is represented by a number, such as 0 for a tree or other object not of interest, 1 for a person, 2 for a pet, etc. However, in other examples, the group identifier can be represented in other ways. The output of the object detection process 814 may also include a confidence score indicating the level of certainty that the ANN has with respect to the type of object identified (e.g., the confidence score may indicate how certain is the process that the object is person or pet vs something else, such as a tree, for example). In examples, the confidence score is a number between 0 and 1, with higher confidence (score closer to 1) indicating greater probability that the object is in fact what the group identifier indicates that it is.

Referring again to FIG. 9A, and as discussed above, the controller 700 is configured to perform an object tracking process 816 on the outputs from the motion detection process 812 and the object detection process 814 to track and categorize detected moving objects 1002. In certain examples, the NPU 708 can be configured to operate one or more ANNs to perform the object tracking process 816 and produce the output(s) 818. In certain examples, the object tracking process 816 includes matching (or pairing) instances of detected motion with detected objects so as to identify and categorize moving objects. For example, if sufficient overlap exists between a bounding box 1004 output from the motion detection process 812 and a bounding box 1006 output from the object detection process 814, the system can link the object associated with the bounding box 1004 with the motion associated with the bounding box 1004 to determine that the object 1002 is moving. In examples, the object tracking process 816 uses an implementation of the linear sum assignment algorithm to pair or match the bounding boxes 1004, 1006 output from the motion detection process 812 and the object detection process 814, respectively. Thus, the pairing process can link detected motion (found during the motion detection process 812) with detected objects (identified during the object detection process 814) to produce the different classes of output 818, as discussed above.

In examples, a Kalman filter is used to track objects in the object tracking process 816. For each frame (acquired at 808), the new object detection results (from 814) are compared to the set of currently tracked objects. If the bounding boxes 1004, 1006 have any overlap, then the tracked objects 1002 are updated accordingly. If a detected object has no overlap with any currently tracked object, then a new tracked object can be created. In examples, the object tracking process 816 includes a timeout feature such that tracked objects are deleted if they have not been updated within a predetermined set time period. In examples, detected motion (from the motion detection process 812) is also tracked from frame to frame using a Kalman filter, for example. As discussed above, the bounding boxes describing detected motion are compared with the bounding boxes describing tracked detected objects, and if there is overlap, the tracked object is tagged as a moving object. In contrast, a tracked object whose bounding box does not overlap with any bounding boxes output from the motion detection process 812 can be identified as a stationary object. Thus, the system can differentiate between moving objects and stationary objects.

In some examples, the Kalman filter state from a tracked object can be used to track detected motion. However, the prediction shape of the bounding boxes may not be consistent frame-to-frame and therefore this could generate false motion. Accordingly, examples use Kalman filters to independently track detected objects and detected motion, and pair the bounding boxes as discussed above to correlate objects with motion. Using the Kalman filters to track detected objects and detected motion over multiple image frames helps to reduce false positive alerts. In certain examples, the object detection process 814 can be tuned to detect one or more certain types of objects of interest with a relatively low certainty threshold (e.g., with a low confidence indicator, as discussed above) that allows for false positives that are then filtered out during the object tracking process 816. In this manner, the system can be configured with an initial bias towards detection, so as to avoid missing an object of interest. However, the subsequent filtering can remove false positive detections before an alarm is triggered, thereby reducing the number of false alarms that a user of the security system receives. For example, using the Kalman filters to track objects and motion through multiple image frames allows the system to reject isolated instances of motion and/or object detection that are not repeated frame-to-frame and which therefore may represent noise or simply a detection error. Thus, the use of Kalman filters or other processes to track detections over multiple frames of image data can add robustness to false negatives and filter out false positives.

As discussed above, the object tracking process 816 can be configured to generate three classes of output 818, including recognized moving objects (recognized objects paired with motion), stationary objects (detected objects that are not paired with motion), and "unknown motion" (detected motion that is not paired with a recognized object). Based on these classes of output 818, the sensor 702 (and/or the security system in which it is used) can be configured to take different actions. The "moving objects" class of outputs 814 can include known objects of interest and objects not of interest. Stationary objects or moving objects that are not identified as objects of interest can be safely ignored by the system such that their detection does not trigger an alarm. As discussed above, in examples of the sensor 702, the object detection process 814 can be configured or tuned to identify certain types of objects, such as people, animals, vehicles, trees, etc., that can be classified as either objects of interest or objects not of interest. For example, as discussed above, an ANN can be trained, based on a large training data set of images of people, animals, etc., to recognize certain objects, such as people or pets. In examples, pets, or at least one type of pet (e.g. dogs or cats), can be identified as objects not of interest that can be safely ignored. Accordingly, the sensor can be configured such that detection of a pet is ignored and does not trigger an alarm. However, detection of other motion, including motion associated with other animals not corresponding to the predefined pet class of objects, can still cause the sensor to trigger an alert. Thus, false positive alarms caused by pets can be reduced, without compromising or reducing the sensitivity of the system to motion events caused by other objects, which may represent threats.

In certain examples, the output 818 from the object tracking process 816 can include lists of detected people, detected pets, and detected unknown motion. The sensor 702 can be configured to take a specific action in response to each of these three categories of detections. Detection of anything else may be ignored by the system. For example, detection of a person can cause the sensor 702 to trigger an alert and/or an alarm. Detection of unknown motion can cause the sensor 702 to trigger an alert that can include initiating a video recording of the scene, as discussed above. Detection of a pet can cause the sensor to return to the low power mode of operation (e.g., deactivate the image capture device 706) without triggering an alert or alarm.

Accordingly, referring again to FIG. 9A, the process 900 evaluates the frame of image data as processed at 816 to determine what class of output 818 has been detected. In examples, the process 900 evaluates the processed frame of image data to determine whether or not a moving object of interest, such as a moving person, for example, has been detected, as indicated at decision block 904. If a moving object of interest is detected, an alert is triggered at 906.

Similarly, at 908, the system evaluates whether the object associated with the detected motion event is a pet. As discussed above, this can be accomplished using an ANN trained to recognize pets. Steps 904 and 908 can be performed sequentially or in parallel.

As noted above, in some instances, the output 818 may include unknown motion. Accordingly, if no moving pet is identified at 908 and no moving object of interest is identified at 904, the methodology 900 includes evaluating the processed frame of image data to determine whether an unrecognized moving object has been detected, as indicated at decision block 910. In the case of unknown motion, the motion detection process 812 detects motion, but the object(s) associated with the motion cannot be identified by the object detection process 814 as either an object of interest or an object not of interest (e.g., corresponds to an unrecognized object). For example, some image frames may not include sufficient resolution or information describing the object for the system to determine, in the object detection process 814, whether that object is one of the types of recognized objects (classified as either of interest or not). An unrecognized moving object may represent a threat, and therefore should not be ignored. Accordingly, if an unrecognized moving object is detected at 910, an alert is triggered at 906.

If, for the current processed image frame, no moving object of interest has been detected at 904 and either a pet is detected at 908 or no unknown motion is detected at 910, the process determines whether or not a maximum number of attempts has yet been reached, as indicated at decision block 912. In examples, processing a single frame of image data is considered a single attempt. A configuration setting determines the maximum number of attempts.

If the maximum number of attempts has not yet been reached, the image capture device 706 captures another frame of image data for processing. As discussed above, in some examples, the motion detection process 812 includes comparing multiple frames of image data obtained using the image capture device 706. Therefore, in some examples, the process 900 repeats at least once to obtain two frames of image data. In other examples, acquiring the frame of image data at 808 includes acquiring at least two initial frames of image data using the image capture device 706, such that a first instance of the motion detection process 812 includes processing the at least two initial frames of image data. In some examples, the motion detection process 906 and the object detection process 908 can operate on a batch including multiple image frames in one attempt, so as to avoid multiple repetitions of the process 900 or reduce the number of attempts before the process 900 ends at 914.

After the maximum number of attempts is reached, if no moving object of interest or unrecognized moving object is detected, the system re-enters the low power state without triggering an alert and the process ends at 914. Limiting the maximum number of attempts provides a benefit of conserving power and battery life by ending the process 900 in scenarios where no potential threat is detected. Allowing more than one attempt provides robustness and increased reliability in detecting potential threats. In addition, in the case of pet detection, performing multiple attempts helps to ensure that the detected moving object is indeed a pet, rather than a potential object of interest or threat. Thus, if a moving pet is detected, and the maximum number of attempts (indicated at decision block 918) has not been reached, the system can proceed to acquire further frames of image data as discussed above. If, after the maximum number of attempts has been reached, the detected motion is only associated with the pet, the process ends at 914 without an alert being triggered, and the sensor can return to the low power mode of operation, as discussed above. Thus, detections of motion caused by pets that could otherwise cause the sensor to trigger a false alarm are filtered out by the methodology 900.

Triggering the alert 906 may represent different actions. For example, if a moving person is detected at 904, triggering the alert at 906 may include triggering an alarm (e.g., activating a siren or other audible response, contacting authorities or other security personnel, and/or taking other actions to indicate detection of a possible threat). In some examples, detection of unknown motion at 910 can trigger the sensor 702 to initiate a video recording that can be stored for viewing by a human operator to verify whether or not the object represents a threat. Thus, in this example, triggering the alert at 906 includes initiating the video recording. In some examples, the video recording can be acquired by the image capture device 706. In some instances, the recording can be viewed by a human operator via a user interface that displays images from the sensor (e.g., user interface 418 discussed above). In other examples, the recording can be utilized by another part of the security system and/or accessed by the human operator via an application running on a computing device, such as a smart phone or tablet, for example, as discussed above. In further examples, the recording can be transmitted to a monitoring center environment 120 for review by a human operator or AI device. If the reviewer determines that the object associated with the unknown motion is an object of interest an instruction can be transmitted to the sensor 702 and/or another component of the security system at the monitored location to trigger an alarm. In some examples, the reviewer's determination (e.g., object of interest or object not of interest) can be provided to the sensor 702 to be used in training the ANN implementing the object detection process 814 discussed above.

In the example shown in FIG. 9A, the process 900 includes triggering an alert at 906 based on detection of an unrecognized moving object at 910. Referring to FIG. 9B, in a variation of the methodology 900, the system may attempt to obtain more information to classify the unrecognized object prior to triggering the alert at 906. For example, based on detection of an unrecognized moving object at 910, the system may set a flag, as indicated at 916, and then proceed to check whether the maximum number of attempts has been reached (indicated at decision block 912). If the maximum number of attempts has not been reached, the sensor captures another frame of image data for processing, and repeats the processing and analysis discussed above. At decision block 910, the process again includes determining whether an unrecognized object is still associated with the detected motion event. Repeating this process allows the sensor 702 to process more image frames to attempt to determine whether the unrecognized object can be identified as corresponding to either a predefined object of interest or a predefined object not of interest, as discussed above. This can reduce the number of alerts triggered at 906, which can advantageously both save battery power for the sensor 702 and reduce instances of having to engage human review.

If when the maximum number of attempts is reached, the unrecognized object flag (set at 916) is still true (indicated at decision block 918), an alert is triggered at 906. If the further processing has resulted in the unrecognized object being identified, and the unrecognized flag has been cleared, the system re-enters the low power state without triggering an alert and the process ends at 914.

Thus, aspects and examples provide systems and methods that can improve the reliability of, and user experiences with, monitoring security systems. As discussed above, a sensor can be operated primarily in a low power mode, in which components (such as the image sensor 706, for example) are powered down to save power. A motion detector, such as a PIR sensor, remains active in the low power mode and can trigger the sensor to "wake" into normal/full power mode when motion is detected. By processing image frames to categorize the types of detections (e.g., moving objects of interest, moving pets, stationary objects, or unrecognized moving objects), the system can autonomously determine whether or not action is needed or whether the system can ignore detected motion and return to the low power mode to save power. This approach improves the ability of the sensor to manage battery power and improves the reliability of the security systems. Alarms are less likely to be triggered by objects that are not a threat/risk to the user's security, including pets. High power operations (e.g., recording video or transmitting data to a remote location) can be reserved for instances where there is a higher likelihood of a threat. In addition, the number of events that may require review by a human operator are reduced, which may improve the efficiency of the system and the user experience.

Figure 11:
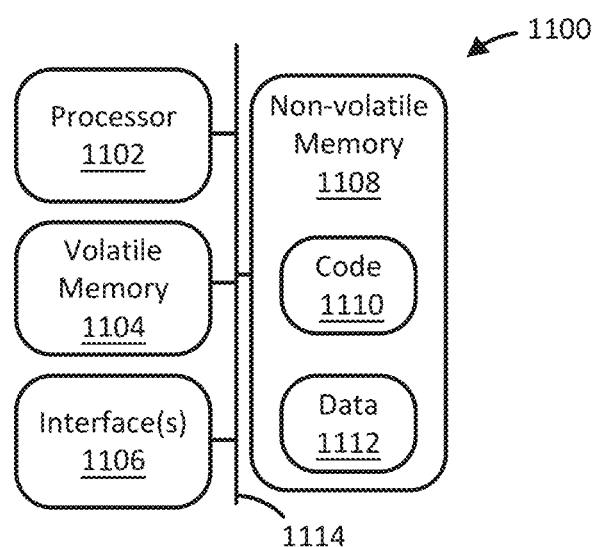
FIG. 11 is a schematic diagram of a computing device, according to some examples described herein.

Turning now to FIG. 11, a computing device 1100 is illustrated schematically. As shown in FIG. 11, the computing device includes at least one processor 1102, volatile memory 1104, one or more interfaces 1106, non-volatile memory 1108, and an interconnection mechanism 1114. The non-volatile memory 1108 includes code 1110 and at least one data store 1112.

In some examples, the non-volatile (non-transitory) memory 1108 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1110 stored in the non-volatile memory can include an operating system and one or more applications or programs that are configured to execute under the operating system. Alternatively or additionally, the code 1110 can include specialized firmware and embedded software that is executable without dependence upon a commercially available operating system. Regardless, execution of the code 1110 can result in manipulated data that may be stored in the data store 1112 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 11, the processor 1102 can be one or more programmable processors to execute one or more executable instructions, such as a computer program specified by the code 1110, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1104) and executed by the circuitry. In some examples, the processor 1102 is a digital processor, but the processor 1102 can be analog, digital, or mixed. As such, the processor 1102 can execute the function, operation, or sequence of operations using digital values and/or using analog signals. In some examples, the processor 1102 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1102 that are multicore can provide functionality for parallel, simultaneous execution of instructions or for parallel, simultaneous execution of one instruction on more than one piece of data.

Continuing with the example of FIG. 11, prior to execution of the code 1110 the processor 1102 can copy the code 1110 from the non-volatile memory 1108 to the volatile memory 1104. In some examples, the volatile memory 1104 includes one or more static or dynamic random-access memory (RAM) chips and/or cache memory (e.g. memory disposed on a silicon die of the processor 1102). Volatile memory 1104 can offer a faster response time than a main memory, such as the non-volatile memory 1108.

Through execution of the code 1110, the processor 1102 can control operation of the interfaces 1106. The interfaces 1106 can include network interfaces. These network interfaces can include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1106 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1112. The output can indicate values stored in the data store 1112.

Continuing with the example of FIG. 11, the various features of the computing device 1100 described above can communicate with one another via the interconnection mechanism 1114. In some examples, the interconnection mechanism 1114 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element, or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

Additional Examples

The following examples pertain to further aspects, from which numerous permutations and configurations will be apparent.

Example 1 includes a method comprising detecting a motion event in a scene using a motion detector, based on detecting the motion event, activating an image capture device to acquire a plurality of images of the scene, applying a motion detection process to the plurality of images to detect motion in the scene, applying an object detection process to at least one of the plurality of images to detect an object in the scene, pairing the motion with the object to locate a moving object, identifying the moving object as a pet, and based at least in part on identifying the moving object as a pet, deactivating the image capture device.

Example 2 includes the method of Example 1, wherein applying the motion detection process to the plurality of images to detect the motion includes processing multiple consecutive image frames.

Example 3 includes the method of Example 2, wherein processing the multiple consecutive image frames includes applying a Kalman filter to the multiple consecutive image frames.

Example 4 includes the method of Example 2, wherein processing the multiple consecutive image frames includes converting each image frame of the multiple consecutive image frames to greyscale to produce multiple consecutive greyscale image frames, comparing pixel intensities between the multiple consecutive greyscale image frames, and detecting the motion based on differences in at least some of the pixel intensities between the multiple consecutive greyscale image frames exceeding a predetermined threshold value.

Example 5 includes the method of any one of Examples 1-4, wherein detecting the motion event includes detecting the motion event using a passive infrared sensor.

Example 6 includes the method of any one of Examples 1-5, applying the motion detection process includes producing a first bounding box identifying a location of the motion in the at least one image, wherein applying the object detection process includes producing a second bounding box identifying a location of the object in the at least one image, and wherein pairing the motion with the object includes determining that the first bounding box and the second bounding box at least partially overlap.

Example 7 includes the method of any one of Examples 1-6, further comprising, based on identifying the moving object as a pet and prior to deactivating the image capture device: acquiring a plurality of additional images of the scene, applying the motion detection process to the plurality of additional images to confirm detection of the motion in the scene, applying the object detection process to at least one of the plurality of additional images to confirm detection of the object in the scene, and confirming identification of the moving object as a pet.

Example 8 includes the method of any one of Examples 1-7, wherein applying the object detection process includes applying an adaptive neural network.

Example 9 provides a method comprising detecting a motion event using a motion detector, based on detecting the motion event, activating an image capture device, acquiring a first set of images of a scene with the image capture device, processing the first set of images to detect a moving object in the scene, identifying the moving object as a pet, based on identifying the moving object as a pet; acquiring a second set of images of the scene with the image capture device, processing the second set of images to confirm detection of the moving object, based on processing the second set of images, confirming identification of the moving object as a pet, and based on confirming the identification of the moving object as a pet, deactivating the image capture device.

Example 10 includes the method of Example 9, wherein processing the first set of images includes applying a motion detection process to the first set of images to detect motion in the scene, applying an object detection process to the first set of images to detect an object in the scene, and pairing the motion with the object to detect the moving object.

Example 11 includes the method of Example 10, wherein applying the motion detection process and applying the object detection process each includes applying a Kalman filter to the first set of images.

Example 12 includes the method of Example 10, wherein applying the motion detection process includes producing a first bounding box identifying a location of the motion in the scene, wherein applying the object detection process includes producing a second bounding box identifying a location of the object in the scene, and wherein pairing the motion with the object includes determining that the first bounding box and the second bounding box at least partially overlap.

Example 13 includes the method of any one of Examples 10-12, wherein processing the second set of images includes applying the motion detection process to the second set of images to confirm detection of the motion in the scene, and applying the object detection process to the second set of images to confirm detection of the object in the scene.

Example 14 provides a sensor comprising a motion detector configured to detect motion events, an image capture device, at least one processor, and a data storage device storing instructions that when executed by the at least one processor configure the sensor to detect a motion event using the motion detector, based on detecting the motion detector, activate the image capture device, acquire a plurality of image frames of a scene using the image capture device, apply a motion detection process to the plurality of image frames to detect motion in the scene, apply an object detection process to at least one of the plurality of image frames to detect an object in the scene, pair the motion with the object to locate a moving object, determine a classification of the moving object, and take a response action based on the classification of the moving object, wherein to take the response action, the sensor is configured to trigger an alarm based on the classification of the moving object corresponding to a person, control the image capture device to record a video sequence based on the classification of the moving object corresponding to an unrecognized object, and deactivate the image capture device based on the classification of the moving object corresponding to a pet.

Example 15 includes the sensor of Example 14, wherein the data storage device further includes instructions that when executed by the at least one processor cause the sensor to operate in a low power mode of operation in which the image capture device is deactivated, detect the motion event while operating in the low power mode of operation, and based on detecting the motion event, operate in a normal mode of operation in which the image capture device is activated.

Example 16 includes the sensor of one of Examples 14 and 15, further comprising a battery coupled to the motion detector, the image capture device, the data storage device, and the at least one processor.

Example 17 includes the sensor of any one of Examples 14-16, wherein the motion detector is a passive infrared sensor.

Example 18 includes the sensor of any one of Examples 14-17, wherein the data storage device further includes instructions that when executed by the at least one processor cause the sensor to, based on applying the motion detection process, produce a first bounding box identifying a location of the motion in the at least one image frame, and based on applying the object detection process, produce a second bonding box identifying a location of the object in the at least one image frame.

Example 19 includes the sensor of any one of Examples 14-18, wherein to pair the motion with the object to locate a moving object, the data storage device further includes instructions that when executed by the at least one processor cause the sensor to determine an overlap between the first and second bounding boxes, and pair the motion with the object based on the overlap between the first and second bounding boxes.

Example 20 includes the sensor of any one of Examples 14-19, wherein the data storage device further includes instructions that when executed by the at least one processor cause the sensor to, based on the classification of the moving object corresponding to a pet or an unrecognized object and prior to taking the response action, acquire one or more additional image frames of the scene using the image capture device, and process the one or more additional image frames to confirm the classification of the moving object, and based on confirmation of the classification of the moving object, take the response action.

The invention claimed is:

1. A method comprising:
    detecting a motion event in a scene using a motion detector;
    based on detecting the motion event, activating an image capture device to acquire a plurality of images of the scene;
    applying a motion detection process to the plurality of images to detect motion in the scene, wherein applying the motion detection process includes producing a first bounding box identifying a location of the motion in at least one image of the plurality of images;
    applying an object detection process to the at least one image to identify a pet in the scene, wherein applying the object detection process includes producing a second bounding box identifying a location of the pet in the at least one image;
    pairing the motion with the pet to identify a moving pet by determining that the first bounding box and the second bounding box at least partially overlap;
    based on identifying the moving pet, acquiring a plurality of additional images of the scene;
    processing the plurality of additional images to confirm (i) detection of the motion in the scene and (ii) identification of the pet in the scene; and
    based at least in part on confirming identification of the pet, deactivating the image capture device.

2. The method of claim 1, wherein applying the motion detection process to the plurality of images to detect the motion includes processing multiple consecutive image frames.

3. The method of claim 2, wherein processing the multiple consecutive image frames includes applying a Kalman filter to the multiple consecutive image frames.

4. The method of claim 2, wherein processing the multiple consecutive image frames includes:
 converting each image frame of the multiple consecutive image frames to greyscale to produce multiple consecutive greyscale image frames;
 comparing pixel intensities between the multiple consecutive greyscale image frames; and
 detecting the motion based on differences in at least some of the pixel intensities between the multiple consecutive greyscale image frames exceeding a predetermined threshold value.

5. The method of claim 1, wherein detecting the motion event includes detecting the motion event using a passive infrared sensor.

6. The method of claim 1, wherein processing the plurality of additional images further comprises:
 applying the motion detection process to the plurality of additional images to confirm detection of the motion in the scene; and
 applying the object detection process to at least one of the plurality of additional images to confirm identification of the pet in the scene.

7. The method of claim 1, wherein applying the object detection process includes applying an adaptive neural network.

8. A method comprising:
 detecting a motion event using a motion detector;
 based on detecting the motion event, activating an image capture device;
 acquiring a first set of images of a scene with the image capture device;
 processing the first set of images to identify a moving pet in the scene, wherein processing the first set of images includes
  applying a motion detection process to the first set of images to produce, in at least one image of the first set of images, a first bounding box identifying a location of motion in the scene,
  applying an object detection process to the at least one image to produce a second bounding box identifying a location of a pet in the scene, and
  pairing the motion with the pet to identify the moving pet by determining that the first and second bounding boxes at least partially overlap;
 based on identifying the moving pet, acquiring a second set of images of the scene with the image capture device;
 processing the second set of images to confirm identification of the moving pet; and
 based on confirming the identification of the moving pet, deactivating the image capture device.

9. The method of claim 8, wherein applying the motion detection process includes applying a Kalman filter to the first set of images.

10. The method of claim 8, wherein processing the second set of images includes:
 applying the motion detection process to the second set of images to confirm detection of the motion in the scene; and
 applying the object detection process to at least one image of the second set of images to confirm detection of the pet in the scene.

11. A sensor comprising:
 a motion detector configured to detect motion events;
 an image capture device;
 at least one processor; and
 a data storage device storing instructions that when executed by the at least one processor configure the sensor to
  detect a motion event using the motion detector,
  based on detecting the motion event with the motion detector, activate the image capture device,
  acquire a plurality of image frames of a scene using the image capture device,
  apply a motion detection process to the plurality of image frames to produce, in at least one image frame of the plurality of image frames, a first bounding box identifying an instance of motion in the scene,
  apply an object detection process to the at least one image frame to produce a second bounding box identifying a location of an object in the scene,
  pair the motion with the object to locate a moving object by determining that the first and second bounding boxes at least partially overlap,
  determine a classification of the moving object, and
  take a response action based on the classification of the moving object;
 wherein to take the response action, the sensor is configured to
  trigger an alarm based on the classification of the moving object corresponding to a person,
  control the image capture device to record a video sequence based on the classification of the moving object corresponding to an unrecognized object, and
  deactivate the image capture device based on the classification of the moving object corresponding to a pet.

12. The sensor of claim 11, wherein the data storage device further includes instructions that when executed by the at least one processor cause the sensor to:
 operate in a low power mode of operation in which the image capture device is deactivated;
 detect the motion event while operating in the low power mode of operation; and
 based on detecting the motion event, operate in a normal mode of operation in which the image capture device is activated.

13. The sensor of claim 11, further comprising:
 a battery coupled to the motion detector, the image capture device, the data storage device, and the at least one processor.

14. The sensor of claim 11, wherein the motion detector is a passive infrared sensor.

15. The sensor of claim 11, wherein the data storage device further includes instructions that when executed by the at least one processor cause the sensor to:
 based on the classification of the moving object corresponding to a pet or an unrecognized object and prior to taking the response action,
  acquire one or more additional image frames of the scene using the image capture device, and
  process the one or more additional image frames to confirm the classification of the moving object; and
 based on confirmation of the classification of the moving object, take the response action.

16. The sensor of claim 11, wherein to apply the motion detection process, the data storage device further includes instructions that when executed by the at least one processor cause the sensor to:
 convert the plurality of image frames to greyscale to produce a plurality of greyscale image frames;
 compare pixel intensities between the plurality of greyscale image frames; and detect the motion based on differences in at least some of the pixel intensities between the plurality of greyscale image frames exceeding a threshold value.

17. The sensor of claim 11, wherein to apply the object detection process, the data storage device further includes instructions that when executed by the at least one processor cause the sensor to apply an adaptive neural network.

18. The method of claim 9, wherein applying the motion detection process to the first set of images includes:
   converting the first set of images to greyscale to produce a set of greyscale images;
   comparing pixel intensities between the set of greyscale images; and
   detecting the motion based on differences in at least some of the pixel intensities between the set of greyscale images exceeding a threshold value.

* * * * *